(12) United States Patent
Haynes, III

(10) Patent No.: US 11,720,967 B2
(45) Date of Patent: Aug. 8, 2023

(54) SYSTEMS AND METHODS FOR DETERMINING PRODUCT ROADMAP INVESTMENT DECISIONS AND RISK ASSESSMENT

(71) Applicant: thrv, LLC, Tiburon, CA (US)

(72) Inventor: James M Haynes, III, Tiburon, CA (US)

(73) Assignee: THRV, LLC, Tiburon, CA (US)

(*) Notice: Subject to any disclaimer, the term of this patent is extended or adjusted under 35 U.S.C. 154(b) by 0 days.

(21) Appl. No.: 17/219,629

(22) Filed: Mar. 31, 2021

(65) Prior Publication Data

US 2021/0350463 A1  Nov. 11, 2021

Related U.S. Application Data

(60) Provisional application No. 63/003,008, filed on Mar. 31, 2020.

(51) Int. Cl.
| | |
|---|---|
| *G06Q 40/06* | (2012.01) |
| *G06F 16/245* | (2019.01) |
| *G06N 20/00* | (2019.01) |
| *G06Q 40/08* | (2012.01) |

(52) U.S. Cl.
CPC ........... *G06Q 40/06* (2013.01); *G06F 16/245* (2019.01); *G06N 20/00* (2019.01); *G06Q 40/08* (2013.01)

(58) Field of Classification Search
CPC ...... G06Q 40/06; G06Q 40/08; G06F 16/245; G06N 20/00
See application file for complete search history.

(56) References Cited

U.S. PATENT DOCUMENTS

| | | | |
|---|---|---|---|
| 6,011,991 A * | 1/2000 | Mardirossian | G16H 40/67 600/544 |
| 8,510,199 B1 | 8/2013 | Erlanger | |
| 2005/0049961 A1 | 3/2005 | Porter et al. | |
| 2014/0067650 A1* | 3/2014 | Gardiner | G06Q 40/025 705/38 |
| 2015/0066772 A1 | 3/2015 | Griffin et al. | |

* cited by examiner

*Primary Examiner* — Bennett M Sigmond
*Assistant Examiner* — Marla Hudson

(57) ABSTRACT

Systems and methods for determining a product investment decision and risk assessment are provided in which a plurality of data is obtained in electronic form. Based on a subset of this data, a taxonomy of data is formed using a plurality of classification models. The taxonomy includes a plurality of classifications determined by the classification models. At least one classification includes a corresponding plurality of input variables in a plurality of variables. Based on the forming, a respective output is determined in accordance with a selection of a set of variables. The respective output is evaluated against a plurality of threshold criteria. If the respective output satisfies each threshold criterion is determined. Based on this determining, a product investment decision and risk assessment for the candidate subject is determined in accordance with the satisfaction of each threshold criterion.

20 Claims, 23 Drawing Sheets

400

*(402)* A method for determining a product investment decision and risk assessment.

*(404)* Obtaining, in electronic form, a plurality of data elements associated with a candidate subject. The plurality of data elements comprises a first set of data elements provided by a first user and a second set of data derived from a plurality of information sources.

*(406)* Forming, based on a subset of the plurality of data elements, a taxonomy of data using a plurality of classification models. The subset of the plurality of data elements comprises less than all of the plurality of data elements and comprises at least one data element from the first set of data and at least one data element from the second set of data. The taxonomy of data comprises a plurality of categories determined by the plurality of classification models. At least one category in the plurality of categories comprises a corresponding plurality of input variables in a plurality of variables associated with a variation in the at least one category.

*(408)* Determining, based on the forming, a respective output from a range of outputs in accordance with a selection of a set of variables comprising a first set of input variables from the corresponding plurality of variables for the at least one category and a second set of control variables associated with the candidate subject.

*(410)* Evaluating the respective output against a plurality of threshold criteria. The plurality of threshold criteria comprises a first threshold criterion associated with the candidate subject and a second threshold criterion associated with a plurality of statistical models.

*(412)* Determining if the respective output satisfies each threshold criterion in the plurality of threshold criteria.

*(414)* Providing, in electronic form, based on the determining if the respective output satisfies each threshold criterion, a product investment decision and risk assessment for the candidate subject in accordance with the satisfaction of each threshold criterion in the plurality of threshold criteria if the respective output satisfies each threshold criterion in the plurality of threshold criteria.

Figure 4 thrv 1 thrv OnTime demo Ontime
+New Feature Thesis | User 1
500-2

- Development
  - Road Map
- Strategy
  - Jobs-to-be-done
- Research
  - Qualitative ☐ Sync and Optimize Stops

Approval: Draft | In Review | Approved
Status: Pending | In Progress | Completed Let User 1 know if you agree with building this feature idea. Otherwise, click Needs Work and leave a coment with your feedback.

*Customer's Goal*
New Feature Idea
What our customers struggle to accomplish.
How we will help out customers satisfy the need faster and more accurately
Job: Get stop a destination on time
Job Step: Plan the stops
Need: Determine the optimal sequence to make planned stops.

Sync and Optimize Stops
To use this feature, a user will:
1. Sync their calendar with the app.
2. Click optimize.
The algorithm will reorder their day to ensure each stop is reached.

Our Customer's Value
How this feature will help our customers satisfy the need with less effort

|  | Speed | Accuracy | Effort |
|---|---|---|---|
| Competitor | 5 | | |
| Baseline | seconds | 33% | 93 |
| New Feature: | 1 second | 90 | 17 |
| | 28-1 | 28-2 | 28-3 |

[ Needs work ] [ Agree ]

Comments

User 2
I just wanted to see how the needs work button worked.

User 1
This is a great feature.

Ask and answer questions about how this feature satisfies customer needs [ Comment ]

Agreement Status 0/2 users have agreed

User 2 — Needs Work
User 1 — Needs Work

Invite other colleagues to review and give feedback [ Send ]

Figure 5B thrv 1 thrv OnTime demo Ontime                                          500-5

| | | | | + New Feature Thesis | User 1 |

Development
    Road Map

| | Need | Competition | Feature | Value | Approval |

Strategy
Jobs-to-be-done

Select a job and a job step.

In the drop down choose the specific job and job step you will focus on in your feature thesis. If you need to add or to edit your Job Data, please go to the Qualitative Page

Research
    Qualitative

Get to a destination on time

Plan the stops

[ Next ]

Figure 5E thrv 1 thrv OnTime demo OnTime    [+ New Feature Thesis]   User 1   500-7

| | Need | Competition | Feature | Value | Approval |
|---|---|---|---|---|---|
| Development | | | | | |
| Road Map | | | | | |
| Strategy | Competitor Solutions | | | | |
| Jobs-to-be-done | To get customers to switch to your product, you need to satisfy the need faster and more accurately than the existing solutions in the market. Estimate how quickly and accurately customers can satisfy the need with competitor features listed here. | | | | |
| Research | Job: Get to a destination on time | | | | |
| Qualitative | Job Step: Plan the stops | | | | |
| | Need: Determine the optimal sequence to make planned stops. | | | | |

Competitor Solution: Tell you when to leave

Description: Give personal asst access to calendar personal assistant interrupts your activity and gets you to leave Competitor Solution: Add stop
Description: A user can add multiple stops to a route. Steps to execute: 1. Execute search for location feature: 3-10 seconds 2. Tap on directions: milliseconds 3. View results: milliseconds. 4. Tap menu in top right: milliseconds 5. Tap add stop: milliseconds 6. Tap into add stop search box: milliseconds 7. Execute search for location feature: 3-10 8. Determine destination by remembering the place name or accessing palce name in another source (email, calendar, etc.): milliseconds to minutes 9. Repeat until all stops are added: seconds to minutes 10. Drag stops around and view the total trip time until you find the shortest time: seconds-minutes Total time: 3 seconds to minutes Accuracy: 50%

✲ Add a Competitor Solution
Speed
[ 10 ] [ min. ▾ ]  ← 28-2
Accuracy
[ 12 % ]  ← 28-1

[ Back ]                                    [ Next ]

Figure 5G 500-9 thrv 1 thrv OnTime demo OnTime

[+ New Feature Thesis]   User 1

- Development
  Road Map

Need — Competition — Feature — Value — Approval

Draft ~ 2020-03-30 ~ Feature Idea

Name and describe your new idea that will satisfy the need faster and more accurately than the existing solutions. Be sure to describe the customer's experience using this feature.

- Strategy
  Jobs-to-be-done

Sync and Optimize

- Research
  Qualitative

This will optimize the user's sequence of stops.

[Back]   [Next]

Figure 5I thrv 1 thrv OnTime demo Ontime

500-13

[+ New Feature Thesis] User 1

- Development
  - Road Map — Need — Competition — Feature — Value — Approval
- Strategy
  - Jobs-to-be-done
- Research
  - Qualitative

Sync and Optimize – Get Your Team Onboard

Your feature thesis is complete. Share it with your colleagues to align with them on how to prioritize this idea. Here's what the email will look like.

Email subject: [name] has a new feature idea!
Email text

Hi,

User 1 has worked on a new feature idea in the thrv app to satisfy one of your customer's unmet needs and wants your thoughts on the feature thesis.

To check it out, click on the link to sign in to thrv or create an account.

Click to view User 1 Feature Thesis

Thanks!

[Preview Feature Thesis Summary]

Enter email addresses here:

hello@example.com, hi@example.com

Separate email addresses by comma

[Back]

There are no invited users

[Skip] [Next]

Figure 5M 600-1 thrv 1 thrv OnTime DemoView | Get JTBD Help | User 1

Roadmap

Product Roadmap

Watch the video introduction

Strategy

Research

Course

| Add a Release | New Feature Thesis |

| All Features | My Features | Features to Review | Completed Releases | View All |

| 1 ⌄ First Release | | | Needs 1 | Tasks 0/2 | Agree 1/2 | | Sep 1, 2020 |

| | Feature Name | Step Priority | Speed | Accuracy | Tasks | Agree | Approval | Status |
|---|---|---|---|---|---|---|---|---|
| 1.1 | Sync and Optimize Stops | High | Very Fast | High | 0/2 | 1/2 | Approved | In Progress |

| 2 ⌄ Second Release | | | Needs 28-1 1 | 28-2 | Tasks 0/0 | Agree 0/0 | | Nov 1, 2020 |

| | Feature Name | Step Priority | Speed | Accuracy | Tasks | Agree | Approval | Status |
|---|---|---|---|---|---|---|---|---|
| 2.1 | Drive Time Estimation | High | - | - | 0/0 | 0/0 | Draft | Pending |

Backlog

| | Feature Name | Step Priority | Speed | Accuracy | Tasks | Agree | Approval | Status |
|---|---|---|---|---|---|---|---|---|
| 1 | Delay Assessment | Medium | - | - | 0/0 | 0/0 | Draft | Pending |

Figure 6A 600-2

| thrv 1 thrv OnTime DemoView | | Get JTBD Help | User 1 |

Strategy — View >

Roadmap
Strategy
Research
Course

Customer: Drivers —26-1

Job: Get to destination on time —26-2

Frequency Customers: 17 Million 26-3— Market Size $1.8 Billion

| Job Step | | Priority | CES |
|---|---|---|---|
| 5 | Plan the stops | High | 86% |
| 4 | Determination how much time to allow for errands along the way | High | 72% |
| 1 | Estimate the departure time under normal travel conditions | High | 79% |
| 16 | Walk to the destination | Medium | 27% |
| 15 | Reset the route as needed | Medium | 76% |
| 14 | Park the vehicle | Medium | 67% |
| 13 | Assess if you are still on time | Medium | 81% |
| 12 | Make planned stops along the way | Medium | 37% |
| 11 | Drive to the destination | Medium | 37% |
| 3 | Determine how much time to allow for atypical travel conditions | Medium | 56% |
| 10 | Prepare the vehicle for the drive | Low | 18% |
| 9 | Walk to the vehicle | Low | 16% |
| 8 | Decide whether or not to make the drive | Low | 25% |
| 7 | Set the departure time | Low | 15% |

User 1

We can get the engineering team to evaluate the different optimization algorithms.

July 23rd, 2020 03:48 pm

User 2

We need to look into the feasibility of creating a highly accurate optimization algorithm and set up appropriate tests for determining if the algorithm is accurate.

Comment

[ Comment ]

Agreement Status

| Name | Status |
|---|---|
| User 2 | Needs Work |
| User 1 | Agree |

Invite People    Invite all company members

Enter email addresses here separated by commas

[ Send ]

Figure 6D

SYSTEMS AND METHODS FOR DETERMINING PRODUCT ROADMAP INVESTMENT DECISIONS AND RISK ASSESSMENT

CROSS REFERENCE TO RELATED PATENT APPLICATION

The present application claims priority to U.S. Provisional Patent Application No. 63/003,008 entitled "Systems and Methods for Determining Product Roadmap Investment Decisions and Risk Assessment," filed Mar. 31, 2020, which is hereby incorporated by reference in its entirety.

TECHNICAL FIELD

The present disclosure relates to systems and methods for determining product roadmapping and product strategy, and, more particularly, to systems and methods for gathering, organizing, structuring, and analyzing market, customer, competitor, and product information and processes to determine product roadmap investment decisions and risk assessment.

BACKGROUND

Making product roadmap investment decisions and assessing the risk of those decisions is exceptionally difficult. This difficulty is a reason why a vast majority of new products fail. At times, product failures can lead directly to the failure of an entire company. For example, BlackBerry, Britannica, and Kodak are just three examples of companies that each made substantial investments in their product roadmaps that led directly to their respective failures as markets and technologies changed rapidly. See Palacios Fenech et al., 2016, "The Dive and Disruption of Successful Current Products: Measures, Global Patterns, and Predictive Model," Journal of Product Innovation Management, 33(1), pg. 53.

The reasons product roadmap investment decisions and risk assessment are so difficult is because the volume of information, the type of information, and the complexity of the decisions to be made are beyond the ability of any human or team of humans. This information and the need to make these decisions changes rapidly, often in real-time, in a world of globally connected markets and competition.

The required information to make product roadmap investment decisions and risk assessment comes from an enormous and growing range of sources, including online pages, online and offline documents, audio, video, customer behaviors, searches, customer purchases, customer calls, product usage, usability testing and tracking, customer feedback, support tickets, and technology-triggered events within a product. This information is in both unstructured and structured forms, providing added complexity in parsing the information.

Gathering, organizing, and structuring this information in real-time in order to analyze the information, calculate product roadmap risk, and determine product roadmap investment decisions is extremely complex. Given the difficulties of gathering, organizing, and structuring the required information and the difficulty of making accurate and timely decisions in real-time with the information, most people and companies resort to manual processes and guesses that result in failed product roadmaps, as was the case with BlackBerry, Britannica, and Kodak.

Prior solutions to product roadmap investment decisions and risk assessment fail to deliver accurate and timely information, calculations, and decisions. For instance, prior solutions neither have in one database the information required to make product roadmap investment decisions and risk assessment, nor a systematic way of gathering, organizing, and structuring the relevant information in real-time. Moreover, these prior solutions do not have a systematic way of filtering information that is not relevant to the investment decision and the risk assessment. Additionally, prior solutions lack a systematic way of calculating precise investment analysis (e.g., revenue, costs, returns) and risk assessment (e.g., probability of success) in real-time with the required data. Further, these solutions do not have a systematic way of automatically structuring information to function as inputs into product roadmap and risk assessment decisions. Also, prior solutions do not have a systematic way of enabling users to evaluate the information, the investment decisions, and the risk assessment in real time.

The information disclosed in this Background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

The present disclosure provides improved systems and methods for determining product roadmap investment decisions and risk assessments. As such, turning to more specific aspects of the present disclosure, one aspect of the present disclosure is directed to providing systems and methods that maintain a taxonomy of data of stored data elements that are updated (e.g., in real-time) based on a plurality of data elements gathered from a plurality of information sources utilizing a plurality of data gathering mechanisms. In some embodiments, the plurality of data elements gathered by the systems and method of the present disclosure includes structured data, semi-structured data, and unstructured data. The systems and methods of the present disclosure overcomes difficulties in determining product roadmap investment decisions and risk assessment by gathering the plurality of data elements, classifying the plurality of data elements, and structuring the classified data elements into a taxonomy of data. Further, the systems and methods of the present disclosure allow for conducting evaluations on the taxonomy of data using a plurality of statistical models in concert with a selection of a plurality of variables from the classified data elements into a taxonomy of data in order to determine product roadmap investment decisions and risk assessment. In some embodiments, the selection of the plurality of variables is dynamically reconfigured in accordance with determining if each threshold criterion in a plurality of threshold criteria is satisfied. In some embodiments, the systems and methods of the present disclosure allow facilitate providing, in electronic form, the determination of the product roadmap investment decision and risk assessment, such as configuring a user interface to present the determination of the product roadmap investment decision and risk assessment.

In some embodiments, the gathering of the plurality of data elements is conducted using a plurality of data gathering mechanism. In some embodiments, the plurality of data gathering mechanisms including one or more automated search and collection data gathering mechanisms, (e.g., a collection of web pages), one or more conversion of analog signals data gathering mechanisms (e.g., a voice call), one or more user input data gathering mechanisms (e.g., a defined customer need obtained from a user, a response to a survey data gathering mechanism, etc.). In some embodiments, the systems and methods of the present disclosure obtains the plurality of data elements and forms the taxonomy of data in real-time. For example, as web pages change or as new information is published on the web, as new data element are converted from analog files, or as input by the user, the taxonomy of data is updated in real-time to reflect these new data elements.

The present disclose utilizes a plurality of classification models to organize and structure the plurality of data elements, and, optionally, form a subset of the plurality of data elements, and create the taxonomy of data to facilitate the product roadmap investment decisions and risk assessment.

In more detail, one aspect of the present disclosure provides a method for determining a product investment decision and risk assessment. The method includes obtaining, in electronic form, a plurality of data elements associated with a candidate subject. The plurality of data elements includes a first set of data elements provided by a first user and a second set of data derived from a plurality of information sources. The method further includes forming, based on a subset of the plurality of data elements, a taxonomy of data using a plurality of classification models. The subset of the plurality of data elements includes less than all of the plurality of data elements. Moreover, the subset of the plurality of data elements includes at least one data element from the first set of data and at least one data element from the second set of data. Additionally, the taxonomy of data includes a plurality of classifications determined by the plurality of classification models. At least one classification in the plurality of classifications includes a corresponding plurality of input variables in a plurality of variables associated with a variation in the at least one classification. The method includes determining, based on the forming the taxonomy of data, a respective output from a range of outputs in accordance with a selection of a respective set of variables. The respective set of variables includes first set of input variables from the corresponding plurality of variables for the at least one classification and a second set of control variables associated with the candidate subject. Accordingly, the method includes evaluating the respective output against a plurality of threshold criteria. The plurality of threshold criteria includes a first threshold criterion associated with the candidate subject and a second threshold criterion associated with a plurality of statistical models. Moreover, the method includes determining if the respective output satisfies each threshold criterion in the plurality of threshold criteria. From this, the method includes providing, in electronic form, based on the determining if the respective output satisfies each threshold criterion, a product investment decision and risk assessment for the candidate subject in accordance with the satisfaction of each threshold criterion in the plurality of threshold criteria.

In some embodiments, the obtaining the plurality of data elements utilizes a plurality of data gathering mechanisms to obtain the plurality of data elements. The plurality of data gathering mechanisms includes one or more publication search mechanisms, one or more analog conversion mechanisms, one or more user interface mechanisms, one or more survey mechanism, or a combination thereof.

In some embodiments, the candidate subject is a defined market in a plurality of defined markets. Each market in the plurality of defined markets includes a corresponding plurality of customers.

In some embodiments, the plurality of information sources includes one or more publication sources and one or more private sources.

In some embodiments, the forming the taxonomy of data includes translating, via at least one classification model in the plurality of classification models, the plurality of data elements from a native format into a predetermined structured format.

In some embodiments, the subset of the plurality of data elements is determined by the plurality of classification models.

In some embodiments, each data element in the subset of data elements satisfies a threshold relevancy score determined by at least one classification model in the plurality of classification models.

In some embodiments the first set of input variables in the respective set of variables includes a first input variable of a respective description of customers, a second input variable of a respective description of beneficiaries, a third input variable of a respective description of executors, a fourth input variable of a respective description of purchase decision makers, a fifth input variable of a respective description of customer goals, a sixth input variable of a respective description of customer steps, or a seventh input variable of a respective description of customer needs, or a combination thereof.

In some embodiments, the second set of control variables in the respective set of variables includes a first control variable of a respective description of a speed, a second control variable of a respective description of an accuracy, a third control variable of a respective description of a level of effort, a fourth control variable of a respective description of a perception of effort, or a fifth control variable of a respective description of a perception of emotion, or a combination thereof.

In some embodiments, the plurality of statistical models includes a clustering model, a factoring model, a kurtosis model, a Pareto efficiency model, or an assessment of risk model, or a combination thereof.

In some embodiments, the respective set of variables includes a first variable defined by a user and a second variable defined without human intervention.

In some embodiments, the forming the taxonomy of data further includes storing the taxonomy of data.

In some embodiments, the respective output includes a willingness to pay, a customer segment, a customer value, an assessment of a risk, a financial investment, a probability of success, a revenue growth, a message resource, a return on investment, or a combination thereof.

In some embodiments, the plurality of threshold criteria includes a threshold variance in the selection of the respective set of variables.

In some embodiments, the determining the respective output, evaluating the respective output, and determining if the plurality of threshold criteria is satisfied are repeated at least 10 times before the respective output satisfies each threshold criterion in the plurality of threshold criteria based on the determining if the plurality of threshold is satisfied.

In some embodiments, at least the determining a respective output, the evaluating the respective output, and the determining if each threshold criterion is satisfied are repeated a plurality of times before the respective output satisfies each threshold criterion in the plurality of threshold criteria based on the determining if each threshold criterion is satisfied. In some embodiments, each repetition of the determining a respective output, the evaluating the respective output, and the determining if each threshold criterion is satisfied uses a different respective set of variables including a different respective first set of input variables from the corresponding plurality of variables for the at least one classification and a different respective second set of control variables associated with the candidate subject.

Yet another aspect of the present disclosure is directed to providing a computer system for determining a product investment decision and risk assessment. The computer system including at least one processor, and a memory storing at least one program for execution by the at least one processor. The at least one program including instructions for includes obtaining, in electronic form, a plurality of data elements associated with a candidate subject. The plurality of data elements includes a first set of data elements provided by a first user and a second set of data derived from a plurality of information sources. The at least one program further includes forming, based on a subset of the plurality of data elements, a taxonomy of data using a plurality of classification models. The subset of the plurality of data elements includes less than all of the plurality of data elements. Moreover, the subset of the plurality of data elements includes at least one data element from the first set of data and at least one data element from the second set of data. Additionally, the taxonomy of data includes a plurality of classifications determined by the plurality of classification models. At least one classification in the plurality of classifications includes a corresponding plurality of input variables in a plurality of variables associated with a variation in the at least one classification. The at least one program includes determining, based on the forming the taxonomy of data, a respective output from a range of outputs in accordance with a selection of a respective set of variables. The respective set of variables includes first set of input variables from the corresponding plurality of variables for the at least one classification and a second set of control variables associated with the candidate subject. Accordingly, the at least one program includes evaluating the respective output against a plurality of threshold criteria. The plurality of threshold criteria includes a first threshold criterion associated with the candidate subject and a second threshold criterion associated with a plurality of statistical models. Moreover, the at least one program includes determining if the respective output satisfies each threshold criterion in the plurality of threshold criteria. From this, the at least one program includes providing, in electronic form, based on the determining if the respective output satisfies each threshold criterion, a product investment decision and risk assessment for the candidate subject in accordance with the satisfaction of each threshold criterion in the plurality of threshold criteria.

Yet another aspect of the present disclosure is directed to providing a non-transitory computer readable storage medium storing one or more programs. The one or more programs including instructions, which when executed by a computer system, cause the computer system to perform a method. The method includes obtaining, in electronic form, a plurality of data elements associated with a candidate subject. The plurality of data elements includes a first set of data elements provided by a first user and a second set of data derived from a plurality of information sources. The method further includes forming, based on a subset of the plurality of data elements, a taxonomy of data using a plurality of classification models. The subset of the plurality of data elements includes less than all of the plurality of data elements. Moreover, the subset of the plurality of data elements includes at least one data element from the first set of data and at least one data element from the second set of data. Additionally, the taxonomy of data includes a plurality of classifications determined by the plurality of classification models. At least one classification in the plurality of classifications includes a corresponding plurality of input variables in a plurality of variables associated with a variation in the at least one classification. The method includes determining, based on the forming the taxonomy of data, a respective output from a range of outputs in accordance with a selection of a respective set of variables. The respective set of variables includes first set of input variables from the corresponding plurality of variables for the at least one classification and a second set of control variables associated with the candidate subject. Accordingly, the method includes evaluating the respective output against a plurality of threshold criteria. The plurality of threshold criteria includes a first threshold criterion associated with the candidate subject and a second threshold criterion associated with a plurality of statistical models. Moreover, the method includes determining if the respective output satisfies each threshold criterion in the plurality of threshold criteria. From this, the method includes providing, in electronic form, when the respective output satisfies each threshold criterion in the plurality of threshold criterion based on the determining if the respective output satisfies each threshold criterion, a product investment decision and risk assessment for the candidate subject in accordance with the satisfaction of each threshold criterion in the plurality of threshold criteria.

The systems and methods of the present invention have other features and advantages that will be apparent from, or are set forth in more detail in, the accompanying drawings, which are incorporated herein, and the following Detailed Description, which together serve to explain certain principles of exemplary embodiment of the present invention.

BRIEF DESCRIPTION OF THE DRAWINGS

FIG. 4 provides a flow chart of processes and features of methods for determining product roadmap investment decisions and risk assessment, in accordance with an embodiment of the present disclosure;

FIGS. 5A, 5B, 5C, 5D, 5E, 5F, 5G, 5H, 5I, 5J, 5K, 5L, and 5M collectively illustrate user interfaces for determining product roadmap investment decisions and risk assessment, in accordance with an embodiment of the present disclosure; and FIGS. 6A, 6B, 6C, 6D, and 6E collectively illustrate user interfaces for determining product roadmap investment decisions and risk assessment, in accordance with an embodiment of the present disclosure.

Figure 1:
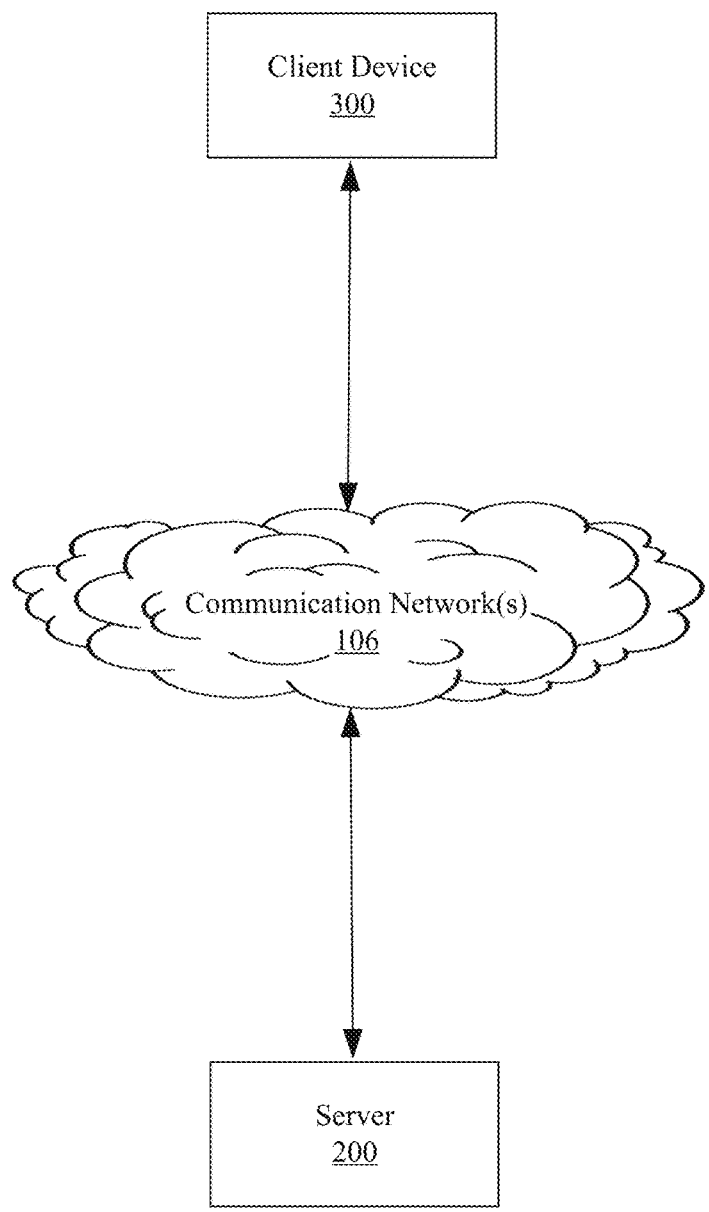
FIG. 1 illustrates an exemplary product roadmap investment decision and risk assessment system topology including a server system and a client device, in accordance with an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a first client device could be termed a second client device, and, similarly, a second client device could be termed a first client device, without departing from the scope of the present disclosure. The first client device and the second client device are both client devices, but they are not the same client device.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, when a reference number is given an "$i^{th}$" denotation, the reference number refers to a generic component, set, or embodiment. For instance, an application termed "application i" refers to the $i^{th}$ application in a plurality of applications.

In the present disclosure, unless expressly stated otherwise, descriptions of devices and systems will include implementations of one or more computers. For instance, and for purposes of illustration in FIG. 1, a client device 300 is represented as single device that includes all the functionality of the client device 300. However, the present disclosure is not limited thereto. For instance, the functionality of the client device 300 may be spread across any number of networked computers and/or reside on each of several networked computers and/or by hosted on one or more virtual machines and/or containers at a remote location accessible across a communications network (e.g., communications network 106). One of skill in the art will appreciate that a wide array of different computer topologies is possible for the client device 300, and other devices and systems of the preset disclosure, and that all such topologies are within the scope of the present disclosure.

FIG. 1 depicts a block diagram of a distributed client-server system (e.g., distributed client-server system 100) according to some embodiments of the present disclosure. The system 100 facilitates determining a product roadmap investment decision and risk assessment for a population of client devices (e.g., client devices 300 of FIG. 3). The system 100 includes a server 200 that facilitates providing of a product roadmap investment decision and risk assessment for the population of client devices 300. The server 200 communicates with one or more client devices 300 through a communications network 106, such as receiving a request from the one or more client devices 300 for a product roadmap investment decision and risk assessment of a candidate subject (e.g., a proposed new product or investment).

Of course, other topologies of the system 100 are possible. For instance, in some embodiments, any of the illustrated devices and systems can in fact constitute several computer systems that are linked together in a network, or be a virtual machine and/or container in a cloud computing environment. Moreover, rather than relying on a physical communications network 106, the illustrated devices and systems may wirelessly transmit information between each other. As such, the exemplary topology shown in FIG. 1 merely serves to describe the features of an embodiment of the present disclosure in a manner that will be readily understood to one of skill in the art. Additionally, in some embodiments, the server 200 and the client device 300 in fact constitute a single computer system. However, the present disclosure is not limited thereto.

Figure 2A:
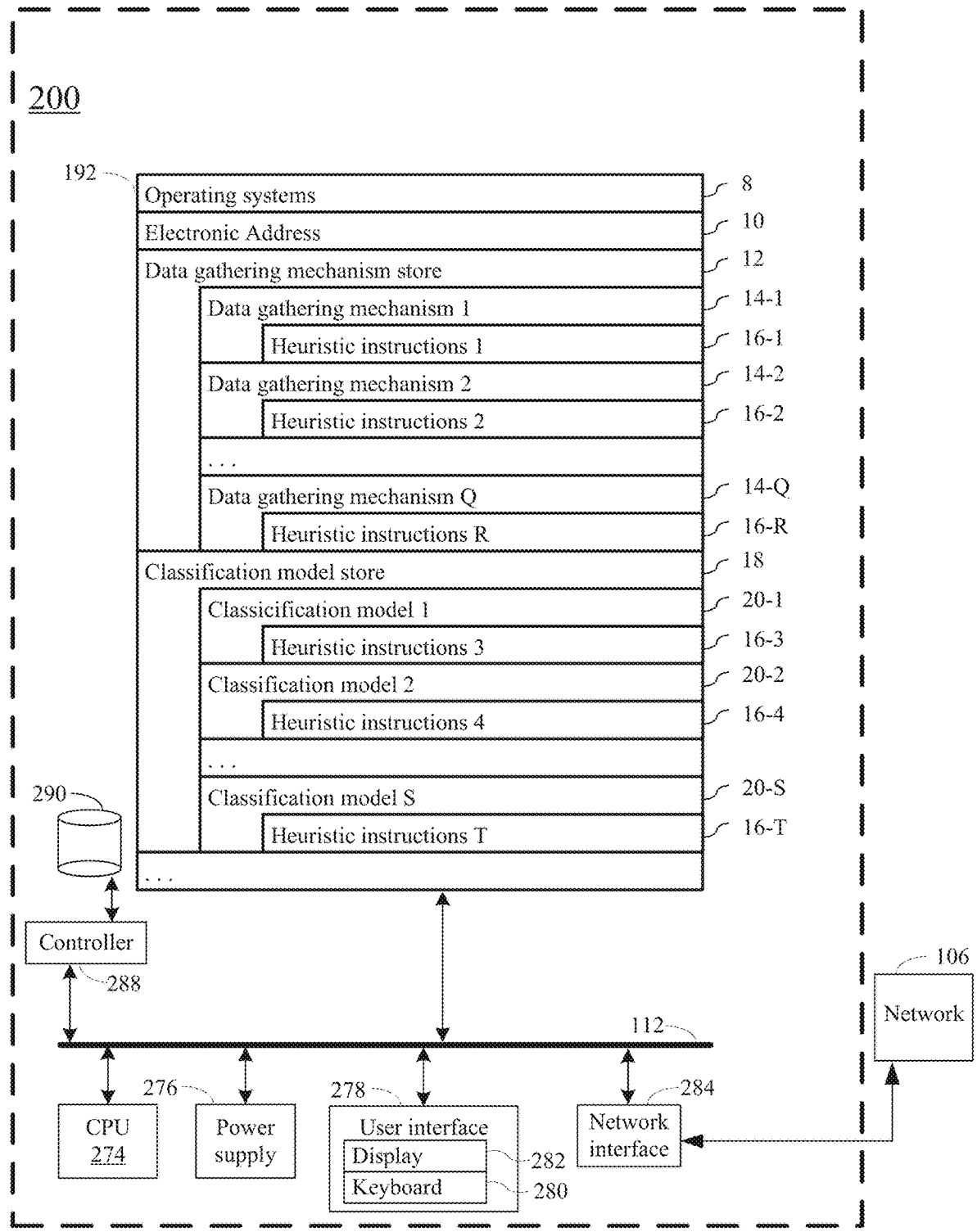
FIGS. 2A and 2B collectively illustrate various modules and/or components of a server system, in accordance with an exemplary embodiment of the present disclosure.
Figure 2B:
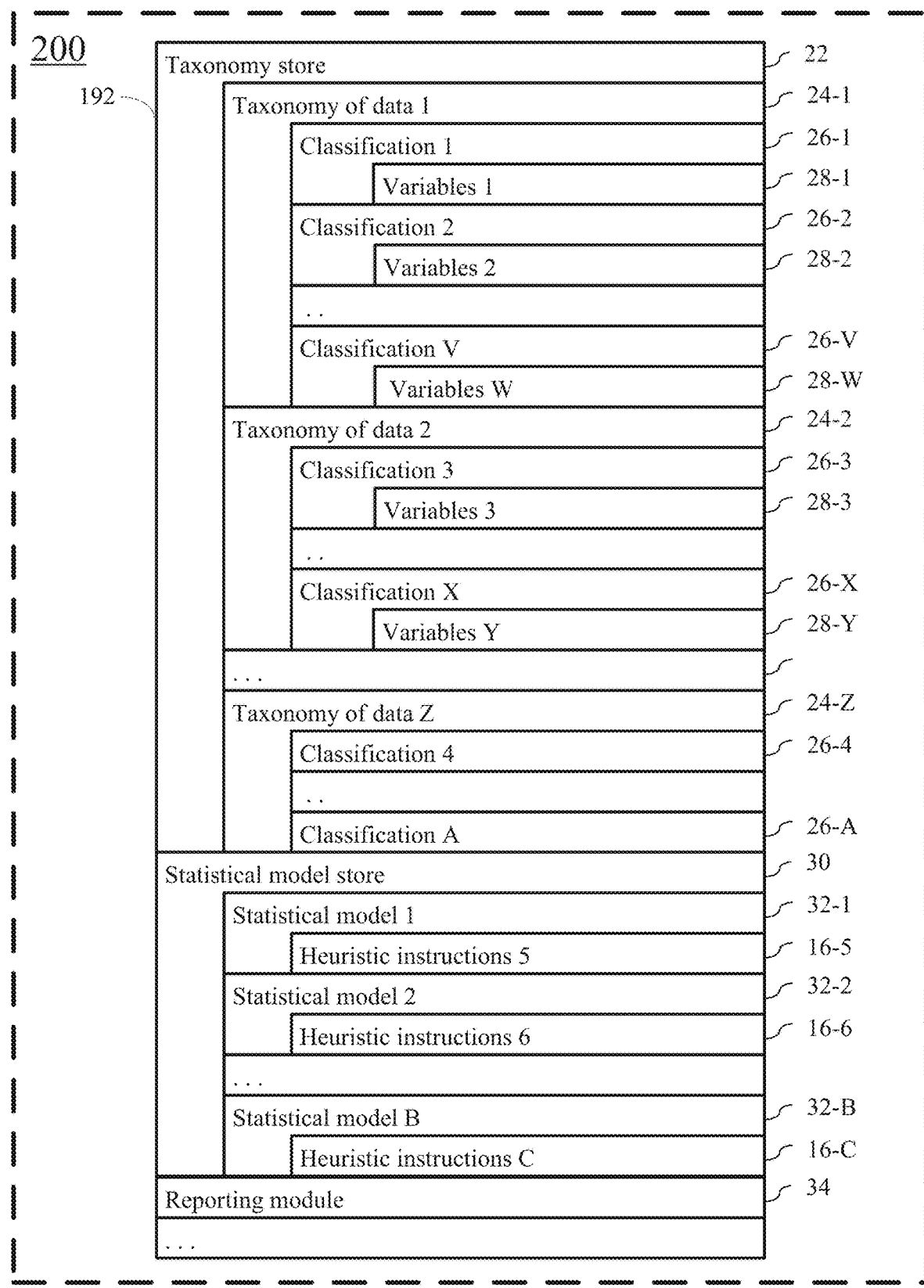
Figure 3:
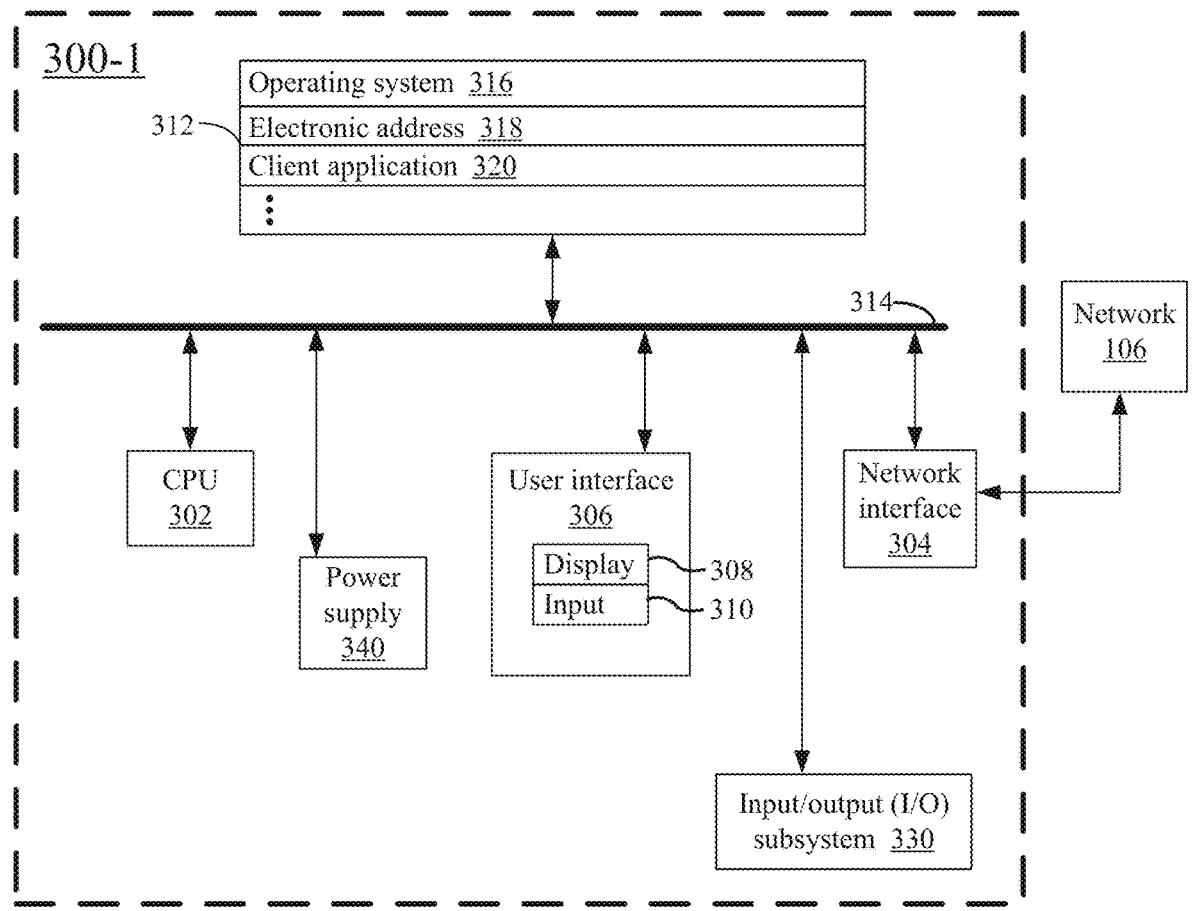
FIG. 3 illustrates various modules and/or components of a client device, in accordance with an exemplary embodiment of the present disclosure.

A detailed description of a system 100 for determining and providing a product roadmap investment decision and risk assessment in accordance with the present disclosure is described in conjunction with FIG. 1 through FIG. 3. As such, FIG. 1 through FIG. 3 collectively illustrate an exemplary topology of the system 100 in accordance with the present disclosure.

Referring to FIG. 1, the server 200 is configured to facilitate determining and providing a product roadmap investment decision and risk assessment of a candidate subject. Specifically, the server 200 gathers a plurality of data elements and forms a taxonomy of data (e.g., taxonomy of data 24-1 of FIG. 2B) based on the plurality of data elements. In some embodiments, the server 200 includes a data gathering mechanism store (e.g., data gathering mechanism store 12 of FIG. 2A) that allows the server 200 to compile the plurality of data elements from one or more sources (e.g., client device 300, from a remote device such as a remote database over communications network 106, etc.) to utilize in determining and providing the product roadmap investment decision and risk assessment of the candidate subject.

In some embodiments, the server 200 obtained the data elements wirelessly through radio-frequency (RF) signals. In some embodiments, such signals are in accordance with an 802.11 (Wi-Fi), Bluetooth, or ZigBee standard.

In some embodiments, the server 200 is not proximate to the client device 300 and/or does not have wireless capabilities or such wireless capabilities are not used for the purpose of determining and providing a product roadmap investment decision and risk assessment. In such embodiments, a communication network 106 is utilized to communicate a determination of a product roadmap investment decision and risk assessment to a client device 300. In some embodiments, the communication network 106 is utilized to communicate a request for such a determination from the client device 300 to the server 200.

Examples of communication networks 106 include, but are not limited to, the World Wide Web (WWW), an intranet and/or a wireless network, such as a cellular telephone network, a wireless local area network (LAN), one or more wide area networks (WAN), a metropolitan area network (MAN), and other devices by wireless communication, or a combination thereof. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 100 other than the one depicted in FIG. 1 are possible. For instance, in some embodiments, rather than relying on a communications network 106, the server 200 wirelessly transmits information directly to the client device 300. Further, in some embodiments, the server 200 constitutes a portable electronic device, a server computer, or in fact constitute several computers that are linked together in a network, or are instantiated as one or virtual machines and/or containers in a cloud-computing context. As such, the exemplary topology shown in FIG. 1 merely serves to describe the features of an embodiment of the present disclosure in a manner that will be readily understood to one of skill in the art.

Turning to FIGS. 2A and 2B with the foregoing in mind, in some embodiments, the server 200 includes one or more computers. For purposes of illustration in FIGS. 2A and 2B, server 200 is represented as a single computer that includes all of the functionality for determining a product roadmap investment decision and risk assessment of a candidate subject. However, the present disclosure is not limited thereto. In some embodiments, the functionality for providing a server 200 is spread across any number of networked computers, and/or resides on each of several networked computers, and/or is hosted on one or more virtual machines and/or one or more containers at a remote location accessible across the communications network 106. One of skill in the art will appreciate that any of a wide array of different computer topologies are used for the application and all such topologies are within the scope of the present disclosure.

An exemplary server 200 for determining a product roadmap investment decision and risk assessment of a candidate subject is provided. The server 200 includes one or more processing units (CPU's) 274, a network or other communications interface 284, a memory 192 (e.g., random access memory), one or more magnetic disk storage and or persistent devices 290 optionally accessed by one or more controllers 288, one or more communication busses 112 for interconnecting the aforementioned components, and, optionally, a user interface 278, the user interface 278 including a display 282 and input 280 (e.g., keyboard, keypad, touch screen), and a power supply 276 for powering the aforementioned components. In some embodiments, a plurality of data elements in memory 192 are seamlessly shared with non-volatile memory 290 using known computing techniques such as caching. In some embodiments, the memory 192 and/or memory 290 includes mass storage that is remotely located with respect to the central processing unit(s) 274. In other words, some data stored in the memory 192 and/or memory 290 may in fact be hosted on computers that are external to the server 200 but that can be electronically accessed by the server 200 over an Internet, intranet, or other form of network or electronic cable (illustrated as element 106 in FIG. 2A) using network interface 284.

In some embodiments, the memory 192 of the server 200 for determining a product roadmap investment decision and risk assessment of a candidate subject includes:

instructions, programs, data, or information associated with an operating system 8 (e.g., iOS, ANDROID, DARWIN, RTXC, LINUX, OS X, WINDOWS, or an embedded operating system such as VxWorks), which includes various software components and/or drivers for controlling and managing general system tasks (e.g., memory management, storage device control, power management, etc.) and facilitates communication between various hardware and software components;

an electronic address 10 associated with the server 200;

a data gathering mechanism store 12 that includes a plurality of data gathering mechanisms 14 (e.g., first data gathering mechanism 14-1, second data gathering mechanism 14-2, . . . data gathering mechanism R 14-R) for obtaining a plurality of data elements from one or more sources in accordance with a corresponding plurality of heuristic instructions 16 associated with a respective data gathering mechanism 14;

a classification model store 18 that stores a plurality of classification models 20 (e.g., first classification model 20-1, second classification model 20-2, . . . classification model S 20-S) that facilitates classifying a plurality of data elements and/or forming a plurality of variables (e.g., first variable 28-1 of FIG. 2B) and a plurality of classifications (e.g., first classification 26-1 of FIG. 2B, second classification 26-2 of FIG. 2B, etc.) based on the classification 26 of the plurality of data elements;

a taxonomy store 22 that retains one or more taxonomies of data (e.g., first taxonomy of data 24-1 of FIG. 2B), each respective taxonomy of data 24 including a corresponding plurality of classifications (e.g., first classification 26-1 of first taxonomy of data 24-1) and variables 28 (e.g., second variable 28-2 of second classification 26-2 of first taxonomy of data 24-1) utilized for storing data elements associated with the classification 26;

a statistical model store 30 that includes a plurality of statistical models 32 utilized to define a respective output (e.g., a customer segment, a risk assessment, etc.) and/or provide an evaluation of the respective output in accordance with a corresponding plurality of heuristic instructions 16; and a reporting module 34 for providing a determination of a product roadmap investment decision and risk assessment of a candidate subject to one or more client devices 300.

An electronic address 10 is associated with the server 200, which is utilized to at least uniquely identify the server 200 and a respective client device 300 from other devices and components of the system 100.

A data gathering mechanism store 12 includes a plurality of data gathering mechanisms 14 that obtain a plurality of data elements associated with a candidate subject. In some embodiments, each candidate subject is a subject matter defined by a user. One example of a candidate subject is as an investment including a new feature idea and/or a new product (e.g., a new consumer product, a new client application 320 of FIG. 3). Another example of a candidate subject is a new process for workflow optimization, etc. or the like. For instance, referring briefly to FIG. 5B, a user interface 500-2 illustrates a first user (e.g., "User 1" of FIG. 5B) that inputs a candidate subject of a new feature idea of "Determine the optimal sequence to make planned stops."

In some embodiments, the candidate subject is a multi-stage process, such as one that is relied upon in the research and manufacture of a wide range of products including biologics, pharmaceuticals, mechanical devices, electrical devices, and food, to name a few examples. One such example of a multi-stage process is a laundry soap packaging line designed to fill each laundry soap box with a set amount of laundry soap.

By allowing the server 200 to obtain the plurality of data elements based on the candidate subject that is provided by the user of the client device 300 the server 200 is capable of providing a determination of a product roadmap investment decision and risk assessment without, or with exceptionally limited, restrictions.

Each respective data gathering mechanism 14 includes a corresponding plurality of heuristic instructions (e.g., first data gathering mechanism 14-1 includes first heuristic instructions 16-1 of FIG. 2A), which define how a respective data gathering mechanism 14 obtains the plurality of data elements from a respective source (e.g., client device 300 of FIG. 3). Moreover, in some embodiments, the corresponding plurality of heuristic instructions 16 define how a respective data gathering mechanism 14 determines if a data element in the plurality of data elements is associated with a candidate subject.

In some embodiments, the server 200 receives at least 10 data elements in the plurality of data elements, at least 20 data elements in the plurality of data elements, at least 30 data elements in the plurality of data elements, at least 40 data elements in the plurality of data elements, at least 50 data elements in the plurality of data elements, at least 60 data elements in the plurality of data elements, at least 70 data elements in the plurality of data elements, at least 80 data elements in the plurality of data elements, at least 90 data elements in the plurality of data elements, at least 100 data elements in the plurality of data elements, at least 200 data elements in the plurality of data elements, at least 300 data elements in the plurality of data elements, at least 400 data elements in the plurality of data elements, at least 500 data elements in the plurality of data elements, at least 1,000 data elements in the plurality of data elements, at least 5,000 data elements in the plurality of data elements, at least 5,000 data elements in the plurality of data elements, at least 15,000 data elements in the plurality of data elements, at least 25,000 data elements in the plurality of data elements, at least 50,000 data elements in the plurality of data elements, or at least 250,000 data elements in the plurality of data elements. In some embodiments, the plurality of data elements received by the analysis system 200 includes a range of data elements from about 1 data element to about 10 data elements, from about 5 data elements to about 25 data elements, from about 20 data elements to about 45 data elements, from about 25 data elements to about 60 data elements, from about 30 data elements to about 90 data elements, from about 50 data elements to about 100 data elements, from about 50 data elements to about 200 data elements, from about 100 data elements to about 200 data elements, from about 100 data elements to about 500 data elements, from about 250 data elements to about 1,000 data elements, from about 250 data elements to about 2,500 data elements, from about 500 data elements to about 5,000 data elements, from about 1,000 data elements to about 10,000 data elements, from about 5,000 data elements to about 50,000 data elements, from about 25,000 data elements to about 500,000 data elements, a combination thereof.

In some embodiments, the plurality of data gathering mechanisms 14 obtains a data element in a first data format and coverts the data element into a second data format in order to structure the data element into a taxonomy of data (e.g., first taxonomy of data 24-1 of FIG. 2B). In some embodiments, for this single data element, the taxonomy of data includes a plurality of unit operations (e.g., two or more, three or more, four or more, five or more, six or more, 10 or more, or 20 or more unit operations). By way of example, in some embodiments, a first data gathering mechanism 14-1 in the plurality of data gathering mechanism 14 converts a data element from an unstructured data format to a structured data format. For instance, consider a data element describing a polynomial equation in unstructured plain text and the first data gathering mechanism 14-1 in the plurality of data gathering mechanism 14 converts the data element from the unstructured plain text format to a structured data format that defines each variable of the polynomial equation and deconstructs the polynomial equation into a plurality of unit operations. In some embodiments, each of these unit operations is considered a classification 26 of the taxonomy 24.

In some embodiments, the data element is in a first data format and the second data format is a second data format other than the first format. For example, in some embodiments, the first data format is a sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format and the second data format is text (e.g., ASCII text). As a non-limiting example of this, in some embodiments, a second data gathering mechanism 14-2 in the plurality of data gathering mechanisms 14 converts a data element in one of the above described audio data formats, which includes a conversation with a customer, into a corresponding text file format that includes a transcript of the conversation with the customer.

As another example, in some embodiments, the first data format is video and sound recorded in a video container (e.g., MP4, 3GP, 3G2, etc.) and the second data format is text (e.g., ASCII text).

In some embodiments, a user of a client device 300, such as a customer associated with a candidate subject, utilizes the client device 300 to input a plurality of data elements in a variety of data formats (e.g., one or more text data formats, one or more audio data formats, one or more video data formats, one or more document data formats, etc.), which is communicated to the server 200. However, the present disclosure is not limited thereto.

In some embodiments, a plurality of data elements exists on a remote device (e.g., a remote server different than server 200) and the plurality of data elements that is obtained by the plurality of data gathering mechanism 14 through the communications network 106. In such embodiments, the plurality of data elements is obtained by the system 100 in various data formats (e.g., two or more formats, three or more formats, four or more formats), such as a native format of a source of a respective data element (e.g., a first data element associated with a picture is obtained from a first source in a compressed format and a second data element associated with the picture is obtained from a second source in an uncompressed format). Moreover, the system 100 allows for obtaining a robust collection of data elements by having the plurality of data gathering obtain data elements from a remote device. As a non-limiting example, in some embodiments, a respective data gathering mechanism 14 in the plurality of data gathering mechanisms 14 includes a corresponding plurality of heuristic instructions 16 that define how the respective data gathering mechanism 14 obtain a plurality of data elements based on a linguistic aspect of the plurality of data elements, such as a human language aspect (e.g., Cantonese or English) or a machine-readable aspect (e.g., pragmatics of a source code) or a subject matter associated with the plurality of data objects (e.g., customer behaviors, searches, customer purchases, customer calls, product usage, usability testing and tracking, customer feedback, support tickets, technology-triggered events within a product, etc.). For instance, in some embodiments, a first data gathering mechanism 14-1 includes a first plurality of heuristic instructions 16-1 that define how the first data gathering mechanism 14-1 obtains a plurality of data elements from computer readable code, such as source code (e.g., HTML, C code, C++ code, Python, PERL, JAVA, etc.), of a client application or an online page. In some embodiments, a second data gathering mechanism 14-2 includes a second plurality of heuristic instructions 16-2 that define how the second data gathering mechanism 14-2 obtains a plurality of data elements from one or more online pages (e.g., a uniform resource locator (URL) address associated with an online page). Additional details and information regarding the gathering of data can be found at Mughal et al., 2018, "Data Mining: Web Data Mining Techniques, Tools and Algorithms: An Overview," Information Retrieval, 9(6), print; Timonin et al., 2016, "The Process of Personal Identification and Data Gathering Based on Big Data Technologies for Social Profiles," International Conference on Digital Transformation and Global Society, 576; each of which is hereby incorporated by reference in its entirety.

As illustrated in FIG. 2B, taxonomy store 22 includes a plurality of taxonomies in some embodiments, and only a single taxonomy in other embodiments. In some embodiments, there is a 1:1 ratio between (i) the number of candidate subjects considered by system 200 and (ii) the number of taxonomies 24 in taxonomy store 22 since each taxonomy 22 is formed in response to obtaining a plurality of data elements associated with a candidate subject. However, it is quite possible that a single candidate element will be associated with (converted into) more than one taxonomy. For example, consider the case where there are two candidate subjects that are closely related, such as one candidate subject that is "Electric vehicle" and another candidate subject that is "Diesel vehicle." In such instances, the two respective taxonomies for "Electric vehicle" and "Diesel vehicle" may share common data elements (e.g. data elements obtained that are related to trends in consumer vehicle purchases). I A classification model store 18 includes a plurality of classification models 20 that facilitate filtering and classifying (e.g., classifications 26 of FIG. 2B) the plurality of data elements (e.g., data elements obtained by one or more data gathering mechanisms 14). In some embodiments, the classifying of the plurality of data elements into a plurality of classifications 26 of a taxonomy of data 24 further includes defining one or more variables (e.g., variables 28 of FIG. 2B) associated with each respective classification 26 in the plurality of classifications 26 formed by the plurality of classification models 20. For instance, in some embodiments, the classifying of the plurality of data elements by the plurality of classification models 20 defines a respective variable 28 in the one or more variables 28 as a control variable 28. In some embodiments, the control variable 28 provides a static boundary condition when providing a determination of a product roadmap investment decision and risk assessment of a candidate subject, such as a threshold accuracy for providing the determination. In some embodiments, the control variable 28 is defined by the user, such as first customer effort variable 28-1 of FIG. 5H, which is user defined through user interface 500-8 as 85 (e.g., on a dimensionless scale of 1-100). In some embodiments, the classifying of the plurality of data elements by the plurality of classification models 20 defines a respective variable 28 in the one or more variables 28 as an input variable 28, which can be configured by either a user of a client device 300 or the server 200. In this way, in some embodiments, the input variable 28 is defined exclusively by the server such as without human intervention, such as in accordance with an evaluation of the plurality of data elements obtained by the plurality of data gathering mechanisms 14. In this way, the server 200 enables the obtaining and classifying of the plurality of data elements to form a robust collection of data elements as a taxonomy of data 24, which is a basis for forming a determination of a product roadmap investment decision and risk assessment of a candidate subject.

As a non-limiting example, a plurality of data gathering mechanisms 14 (e.g., one or more search data gathering mechanism 14, one or more analog to digital conversion data gathering mechanisms 14, one or more user input interface data gathering mechanism 14, one or more survey data gathering mechanisms 14, etc.) obtains a plurality of data elements that is analyzed by the plurality of classification models 20. Accordingly, based on a plurality of heuristic instructions 16 associated with a respective classification model 20 in the plurality of classification models 20, the plurality of data elements is structured into a first classification 26-1 of data elements and a second classification 26-2 of data elements that are each associated with the candidate subject. As such, the plurality of classification models 20 form one or more subsets of the plurality of data elements within each respective classification 26 of a given taxonomy 24. By way of example, in some embodiments, a first classification 26-1 is a first subset of relevant data elements in the plurality of data elements for the product roadmapping investment decisions and risk assessment determination and a second classification 26-2 is non-relevant data elements in the plurality of data elements as determined by the plurality of classification models 20. Accordingly, in some embodiments, the first subset of data elements is further analyzed by one or more classification models 20 in the plurality of classification models 20 and re-classified into a given taxonomy of data 24, such as a first taxonomy of data 24-1 including a product investment decision profile cauterization and a risk assessment profile fourth classification 26-4. Various data elements that are determined not relevant, and thus belonging to the second classification 26-2, are analyzed again with the plurality of classification models 20 and compared with the data elements of the relevant first classification 26-1, and further classified into the given taxonomy of data 24 (e.g., taxonomy 24-1). In some embodiments, the plurality of classifications 26 include a product investment decision profile fifth classification 26-5, a risk assessment profile sixth classification 26-6, and a final not relevant data element seventh classification 26-7, or any sub-combination thereof.

Figure 6C:
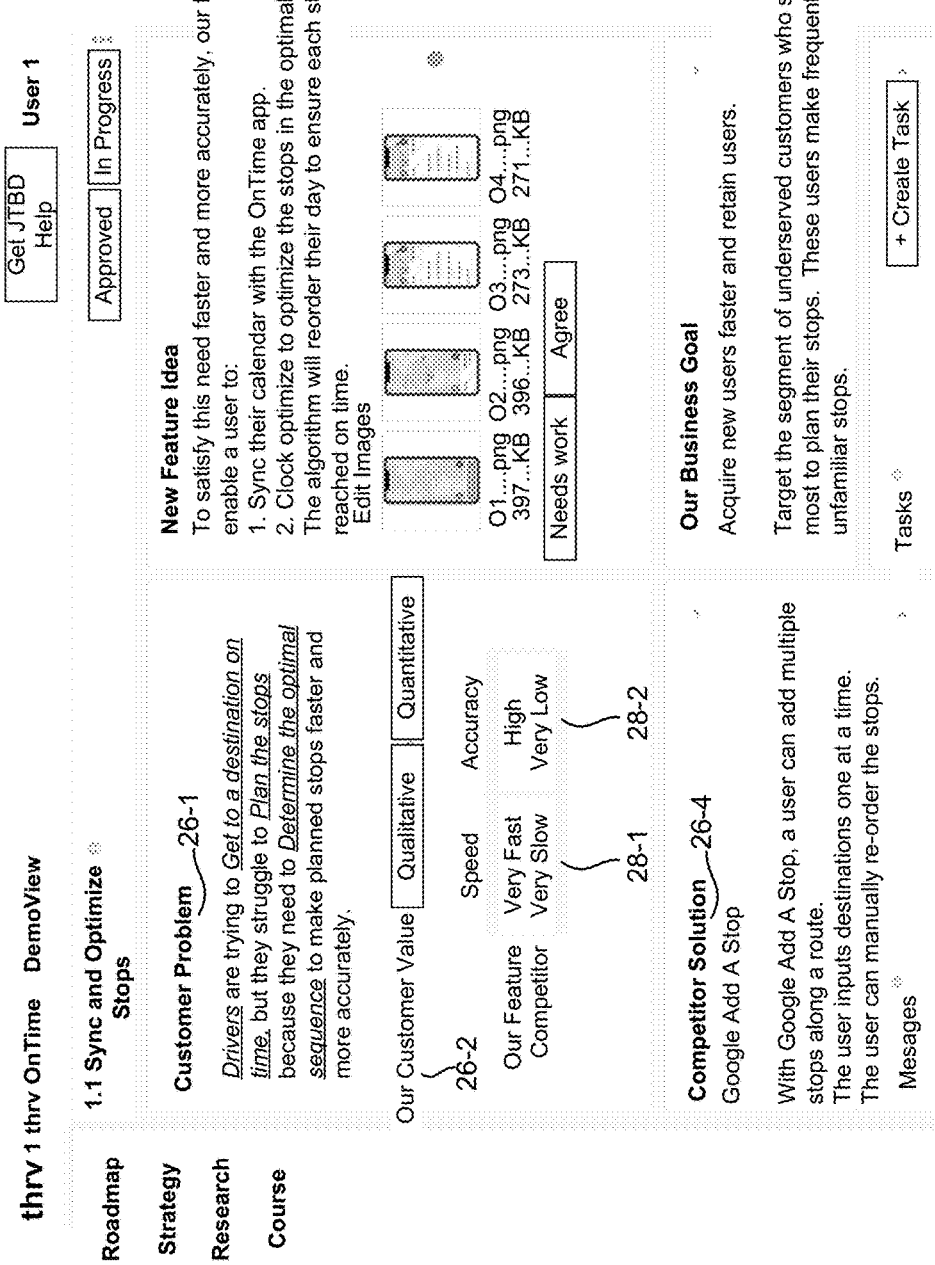
Figure 6E:
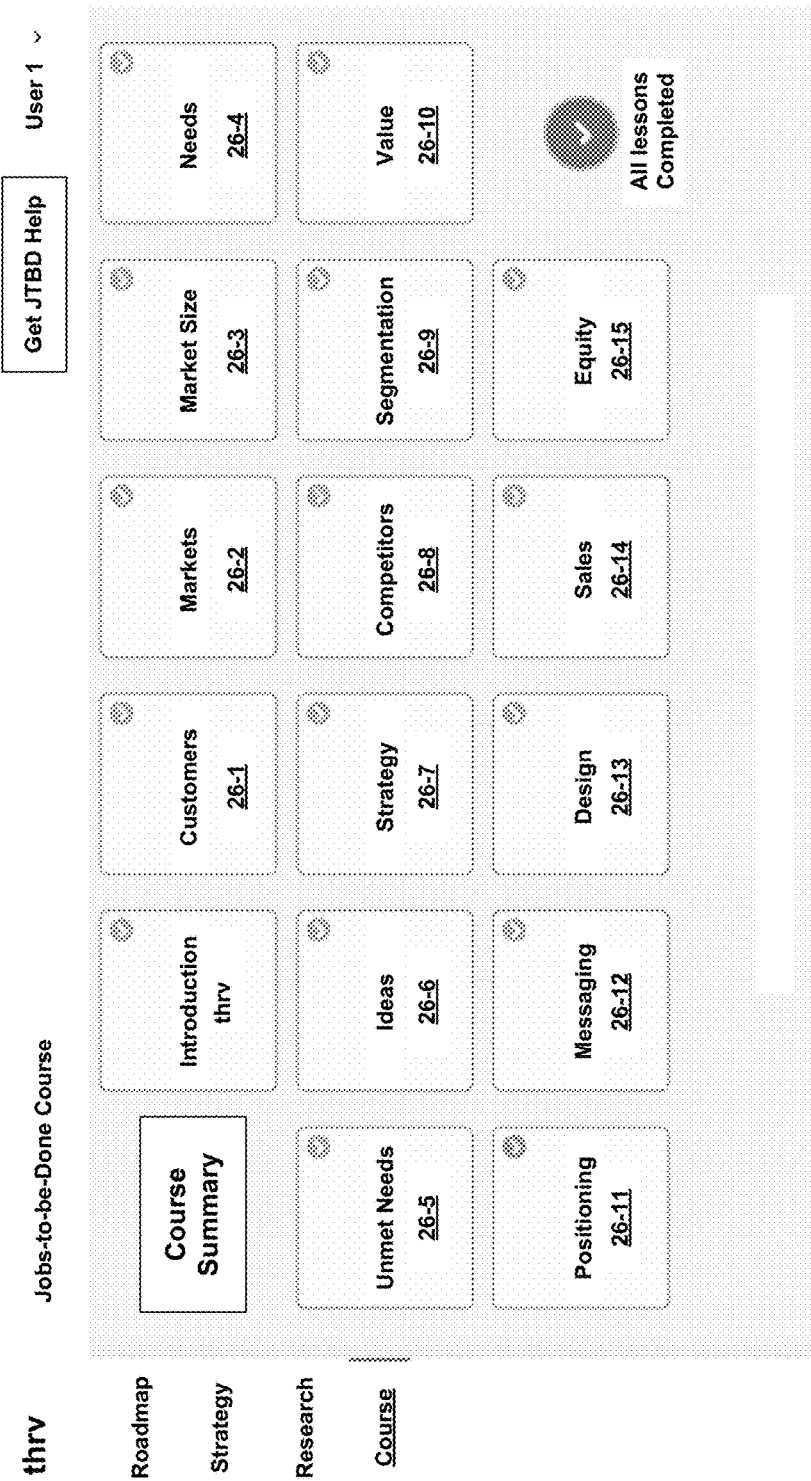

A taxonomy store 22 includes one or more taxonomies of data 24 that each stores a respective subset of the plurality of data elements. The data elements that are stored in any respective taxonomy of data 24 of the taxonomy store 22 is based on the one or more corresponding classifications 26 associated with the respective taxonomy of data 24 as illustrated, for example, in FIG. 2B. In some embodiments, the subset of the plurality of data elements includes less than all of the plurality of data elements, which allows the server 200 to optimize storage of various data elements that are associated with a candidate subject by filtering such data elements obtained by one or more data gathering mechanisms 14 that are not pertinent to the candidate subject. Moreover, in some embodiments, this optimization of storage is facilitated by forming a taxonomy of data 24 with structured data and/or one or more predetermined data structures, which adds cohesion to a plurality of data elements obtained in a variety of disparate forms from one or more sources by the plurality of data gathering mechanisms 14. Each classification 26 is associated with an aspect of providing a determination for a product roadmapping investment decisions and risk assessment of a candidate subject, such as a first classification 26-1 of one or more types of customers 26-1 (e.g., a first grouping of customers in the first classification 26-1 with an age from 18 years old to 35 years old, a second grouping of customers in the first classification 26-1 in a particular geographic region, etc.), a second classification 26-2 of one or more markets, a third classification 26-3 of one or more unmet customer needs, a fourth classification 26-4 of known competitor products or services, and the like (e.g., classifications 26 of FIG. 6E). As such, in some embodiments, classifications are used to segment a population based on some criterion or combination of criteria (e.g., age, income, sex, health status, net worth, number of stock trades made in a given time period, number of units of a given product purchased in a time period, total value of product purchased in a given time period, etc, or any combination or sub-combination thereof).

In some embodiments, the plurality of data elements is stored in any form of data storage format or structure on the server 200 including, but not limited to, a flat file, a relational database (SQL), or an on-line analytical processing (OLAP) database (MDX and/or variants thereof). In some embodiments, as associated data is stored in a single database. In other embodiments, as well as associated data is stored in a plurality of databases that may or may not all be hosted by the same server 200. In such embodiments, some components as well as associated data are stored on computer systems that are not illustrated by FIG. 1 but that are addressable by the communications network 106.

In some embodiments, a particular taxonomy of data 24 (e.g., taxonomy of data 24-1) includes a first classification 26-1 associated with a product investment decision profile of a candidate subject. In some embodiments, the particular taxonomy of data 24 includes a second classification 26-2 associated with a risk assessment profile of the candidate subject. Additionally, in some embodiments, the particular taxonomy of data 24 includes a third classification 26-3 associated with one or more data elements that is not relevant to the candidate subject, which allows for such non-relevant data elements to be utilized for future evaluations of the candidate subject.

A statistical model store 30 stores a plurality of statistical models (e.g., first statistical model 32-1, second statistical model 32-3, . . . , statistical model B 32-B of FIG. 2B) that is utilized in (i) determining a respective output and/or (ii) evaluating a respective output against a plurality of threshold criteria. For each respective statistical model 32 in the plurality of statistical models 32, this determining and/or evaluating by the plurality of statistical models 32 is conducted in accordance with a corresponding plurality of heuristic instructions 16, which define how a respective statistical model 32 determines at a respective outcome, such as pricing. For instance, in some embodiments, the plurality of statistical models 32 determine and evaluate a respective output that includes a customer segment from a range of customer segments (e.g., ranging from capturing no customers to all customers of a market). In some embodiments, the plurality of statistical models 32 correct for a statistical variation when determining and/or evaluation of a respective output, such as a standard deviation in a respective classification 26 of the taxonomy of data 24, an interquartile range of the respective classification 26 of the taxonomy of data 24, a measure of central tendency (e.g., arithmetic mean, weighted mean, midrange, midhinge, trimean, geometric mean, geometric median, Winsorized mean, median, and mode) of the respective classification 26 of the taxonomy of data 24 and the like.

In some embodiments, a respective statistical model 32 in the plurality of statistical models 32 provides a determination of a measure of a risk assessment when evaluating a respective output of the determination. In some embodiments, the measure of the risk assessment is a maximum on return and minimal risk, such as given a first control variable 28-1 and a second control variable 28-2 that are provided by the user with mean returns $\mu_1$, $\mu_2$ and standard deviations $\sigma_1$, $\sigma_2$, respectively, $V_1$ is preferred to $V_2$ in accordance with a determination that $\mu_1$ is greater than or equal to $\mu_2$ and $\sigma_1$ is less than or equal to $\sigma_2$. In some embodiments, $V_1$ and $V_2$ have no relative preference in accordance with a determination that $\mu_1$ is not greater than or equal to $\mu_2$ or and $\sigma_1$ is not less than or equal to $\sigma_2$. Moreover, in other embodiments, the measure of a risk assessment is a value at risk that is a quantification of a determination of level of exposure in a candidate subject that a user can define, at least in part, based on a relative confidence level (e.g., confidence of 85%). Accordingly, the value of risk is a threshold probability criterion (e.g., 15% in the case of 85% confidence). Thus, when a respective variable 28 representative of a candidate subject (X) that can lead to a loss in investment is randomly selected (e.g., defined on a probability space), then a smallest acceptable level of this loss (x) exists, such that $P(X>x)<\alpha$ when $\alpha \in [0,1]$. Additional details and information regarding statistical models 32 can be found at Elliot et. al., 1999, "Mathematics of Financial Markets," Springer Finance, second edition, print, which is hereby incorporated by reference in its entirety.

In some embodiments, a reporting module 34 facilitates generating and configuring one or more user interfaces (e.g., user interfaces 500 of FIG. 5A through 5M, user interfaces 600 of FIGS. 6A through 6E) for displaying a determination of a product roadmap investment decision and risk assessment of a candidate subject at a client device 300.

In some embodiments, one or more of the above identified data stores and/or modules of the server 200 are stored in one or more of the previously described memory devices (e.g., memory 192 and/or memory 290), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 and/or memory 290 optionally stores a subset of the modules and data structures identified above. Furthermore, in some embodiments the memory 192 and/or memory 290 stores additional modules and data structures not described above.

Referring to FIG. 3, a description of an exemplary client device 300 (e.g., first client device 300-1) that can be used with the present disclosure is provided. In some embodiments, a client device 300-1 includes a smart phone (e.g., an iPhone, an Android device, etc.), a laptop computer, a tablet computer, a desktop computer, a wearable device (e.g., a smart watch, a smart garment, a heads-up display (HUD) device, etc.), a television (e.g., a smart television), or another form of electronic device such as a gaming console, a stand-alone device, and the like. However, the present disclosure is not limited thereto.

The client device 300 illustrated in FIG. 3 has one or more processing units (CPU's) 302, a network or other communications interface 304, a memory 312 (e.g., random access memory), a user interface 306, the user interface 306 including a display 308 and input 310 (e.g., keyboard, keypad, touch screen, etc.), an optional input/output (I/O) subsystem 330, a power supply 340, one or more communication busses 314 for interconnecting the aforementioned components, or a combination thereof.

In some embodiments, the user interface 306, the display 308, the input 310, or a combination is as described with respect to the corresponding user interface 278, the corresponding display 282, the corresponding input 280, or the combination thereof of the server 200. For instance, in some embodiments, the input 310 is a touch-sensitive display 308, such as a touch-sensitive surface. In some embodiments, the user interface 306 includes one or more soft keyboard embodiments. In some embodiments, the soft keyboard embodiments include standard (QWERTY) and or non-standard configurations of symbols on the displayed icons. The input 310 and/or the user interface 306 is utilized by an end-user of the respective client device 300 (e.g., a respective subject) to input various commands (e.g., a push command) to the respective client device 300.

It should be appreciated that the client device 300 illustrated in FIG. 3 is only one example of a multifunction device that may be used with the present disclosure. Thus, a client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 312 of the client device 300 illustrated in FIG. 3 optionally includes high-speed random access memory and optionally also includes non-volatile memory, such as one or more magnetic disk storage devices, flash memory devices, or other non-volatile solid-state memory devices.

In some embodiments, the network interface 304 converts electrical signals to from electromagnetic signals and communicates with network 106 and other communications devices, client devices 300 (e.g., a second client device 300-2, client device R 300-R, etc.), and/or the analysis system 200 via the electromagnetic signals. The network interface 304 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The network interface 304 optionally communicates with the network 106. In some embodiments, the network interface 304 does not include RF circuitry and, in fact, is connected to the communication network 106 through one or more hard wires (e.g., an optical cable, a coaxial cable, or the like).

In some embodiments, the memory 312 of the client device 300 stores:
    an operating system 316 that includes procedures for handling various basic system services;
    an electronic address 318 associated with the client device 300-1; and a client application 320 for presenting one or more user interfaces (e.g., user interfaces 500 of FIGS. 5A through 5M, user interfaces 600 of FIGS. 6A through 6E, etc.), such as first user interface for communicating a request for a determination of a product roadmap investment decision and risk assessment of a candidate subject and/or a second user interface receiving the determination of the product roadmap investment decision and risk assessment of the candidate subject.

As illustrated in FIG. 3, a client device 300 preferably includes an operating system 316 that includes procedures for handling various basic system services. The operating system 316 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 318 is associated with each client device 300, which is utilized to at least uniquely identify a client device 300 from other devices and components of the system 100. In some embodiments, the client device 300 includes a serial number, and optionally, a model number or manufacturer information that further identifies the client device 300. In some embodiments, the electronic address 318 associated with the client device 300 is used to provide a source of a request communicated from the client device 300 (e.g., a request for a determination of a product roadmap investment decision and risk assessment of a candidate subject), or to receive such a determination of a product roadmap investment decision and risk assessment of a candidate subject.

Figure 5A:
Figure 5C:
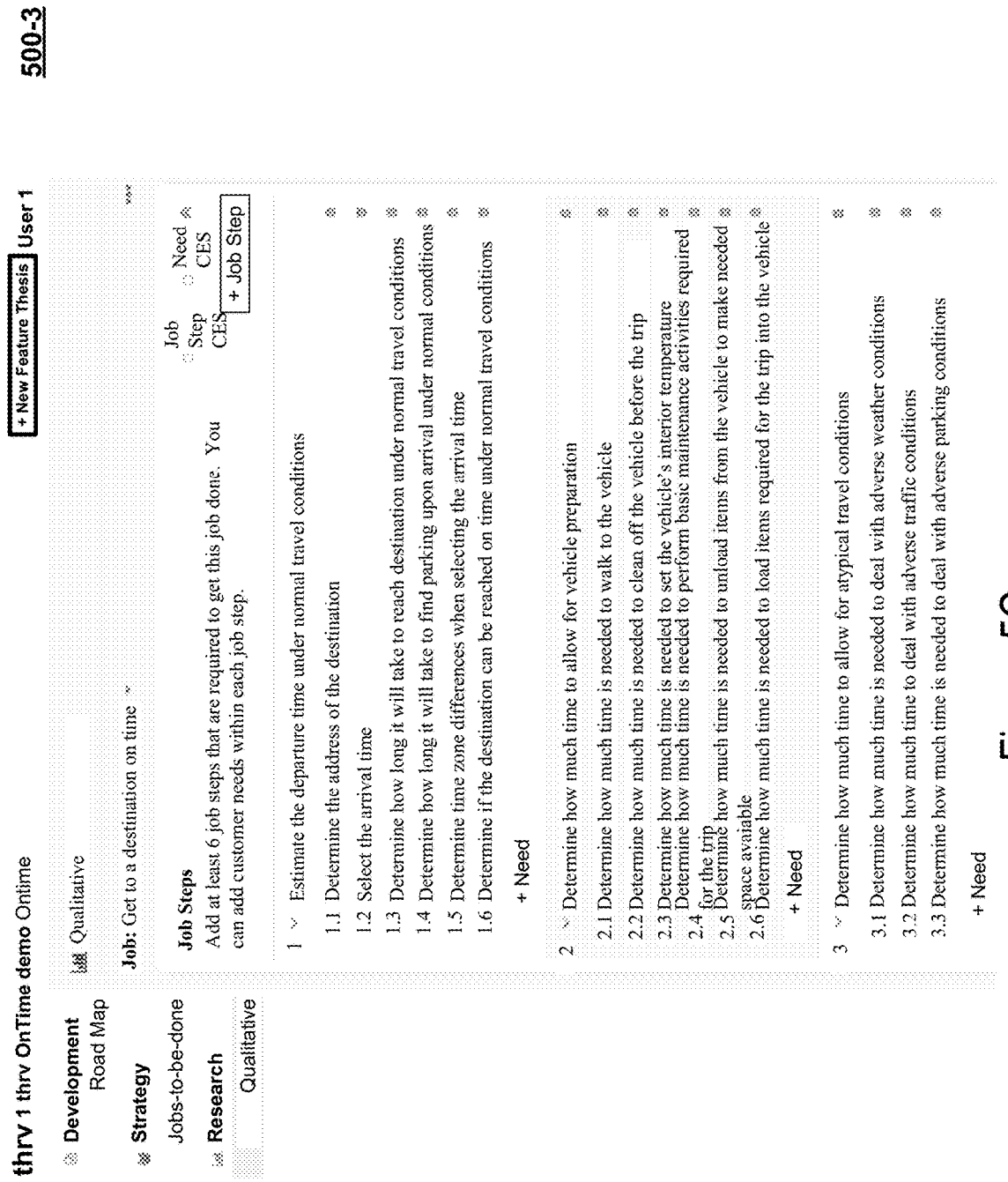
Figure 5D:
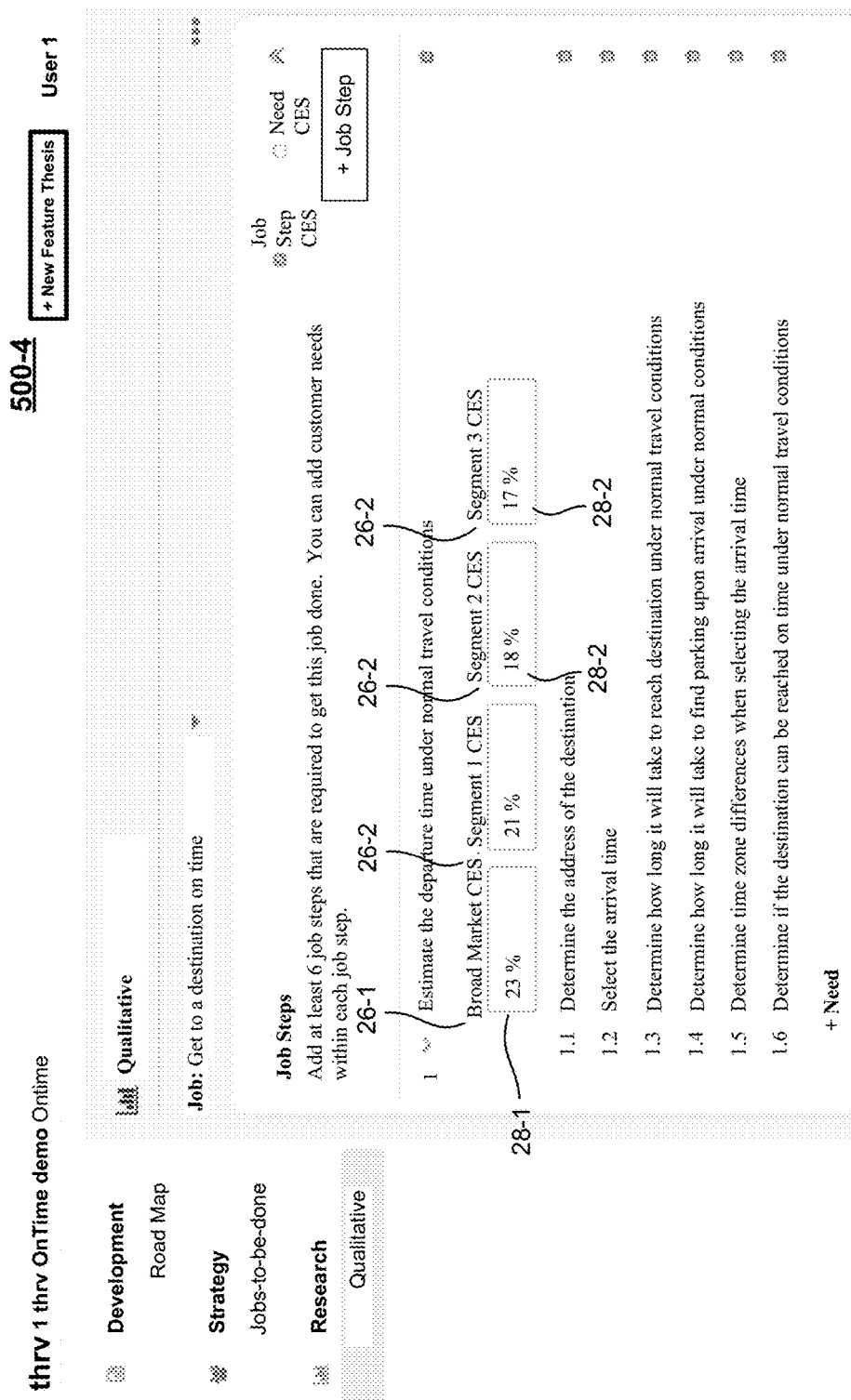
Figure 5F:
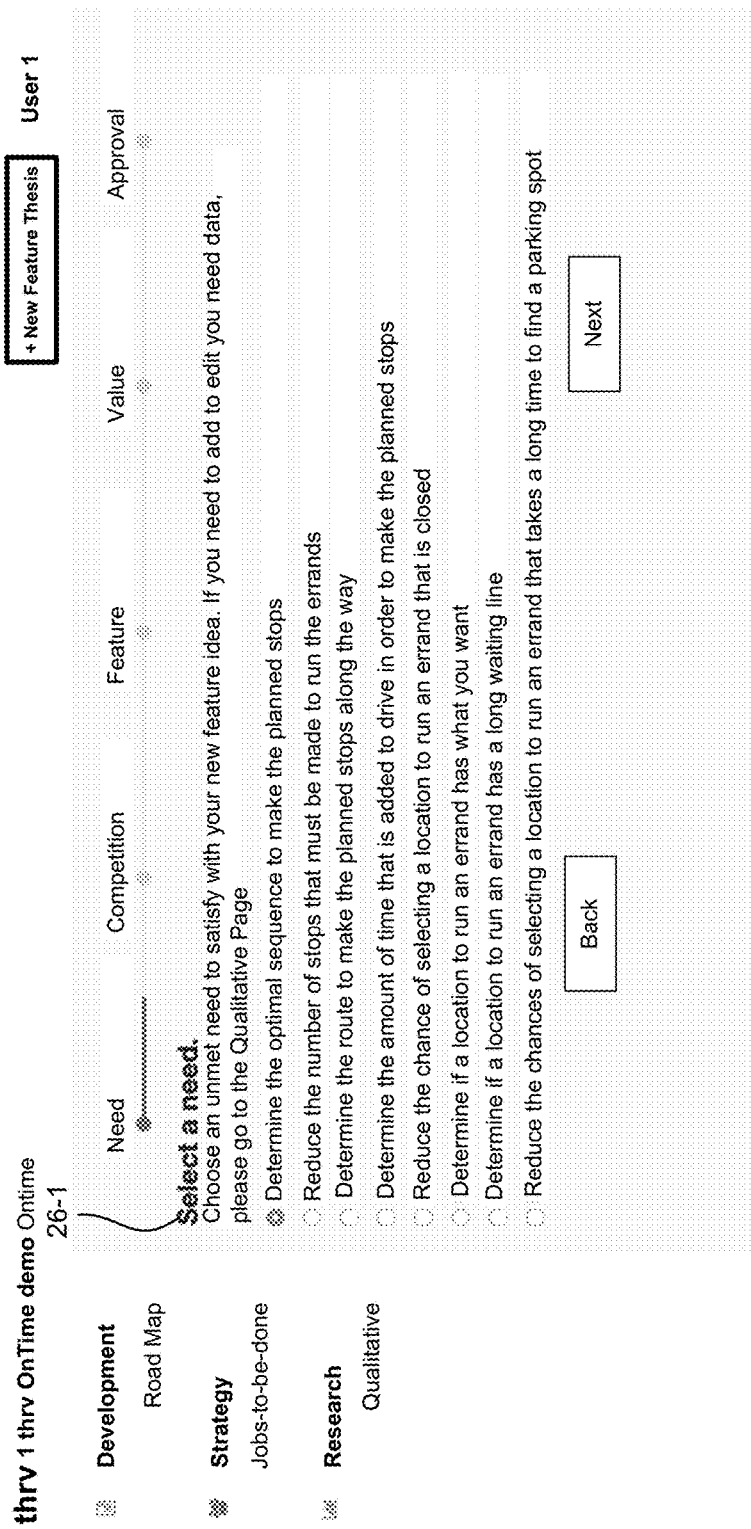
Figure 5H:
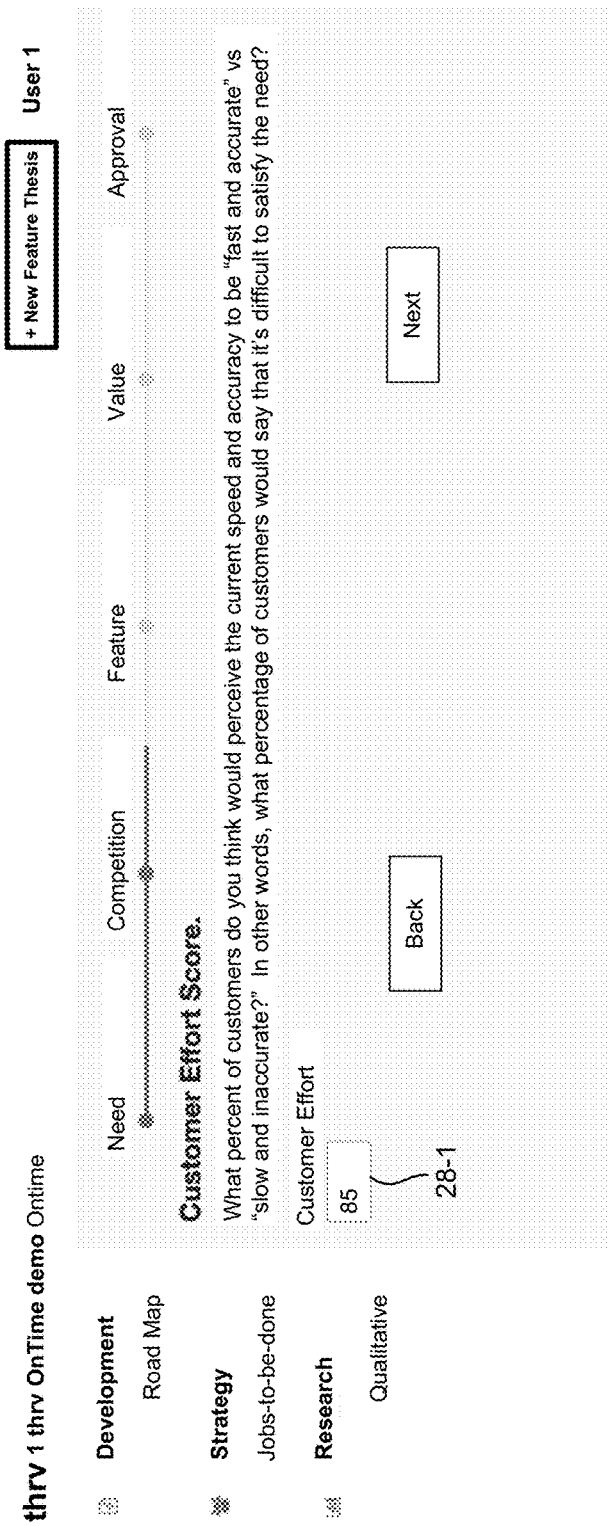
Figure 5J:
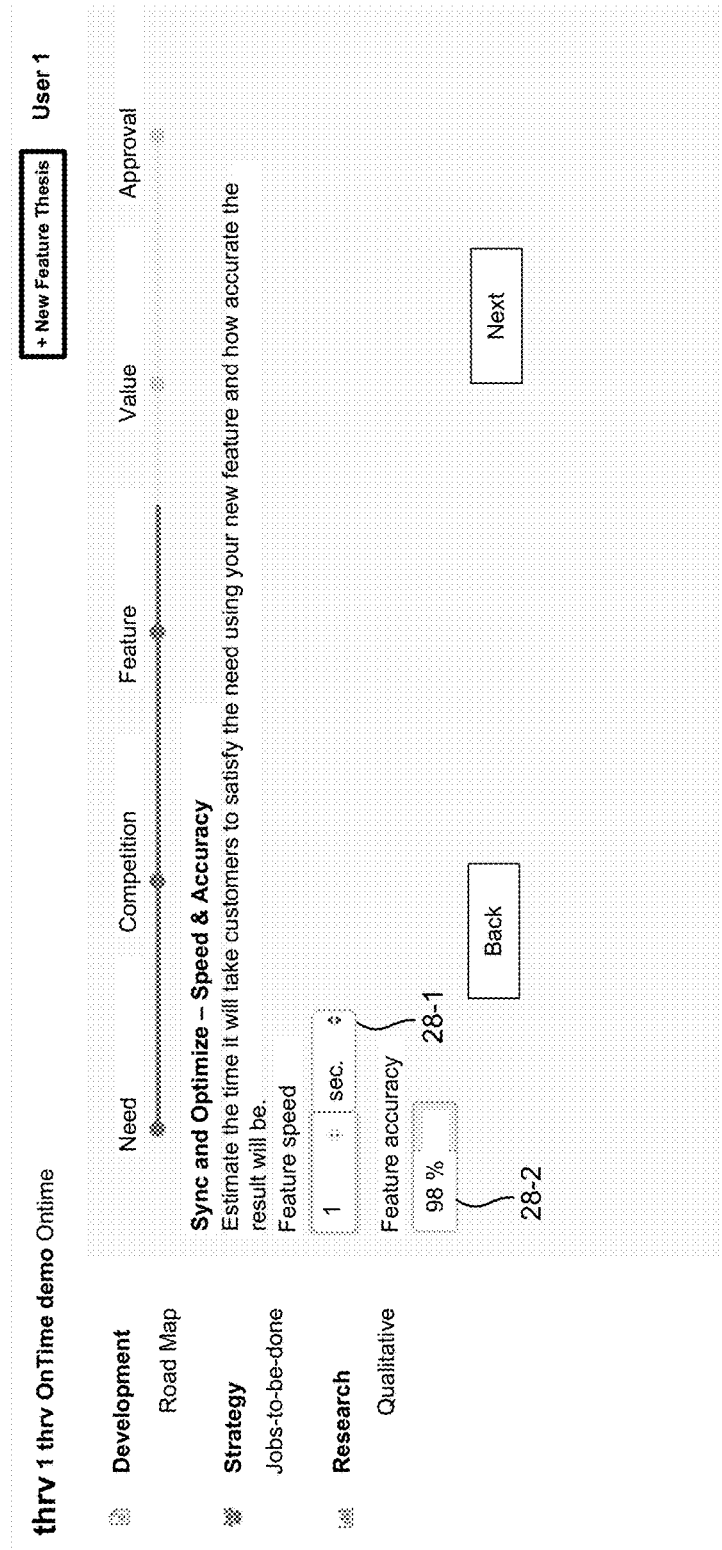
Figure 5K:
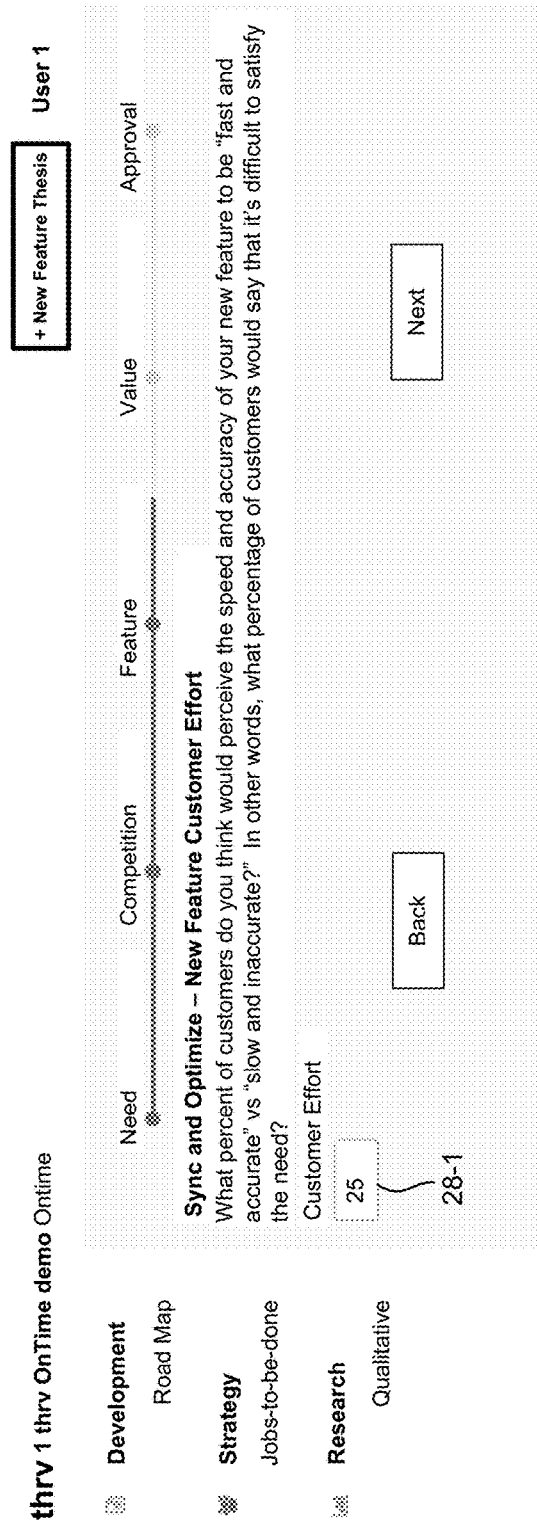
Figure 5L:
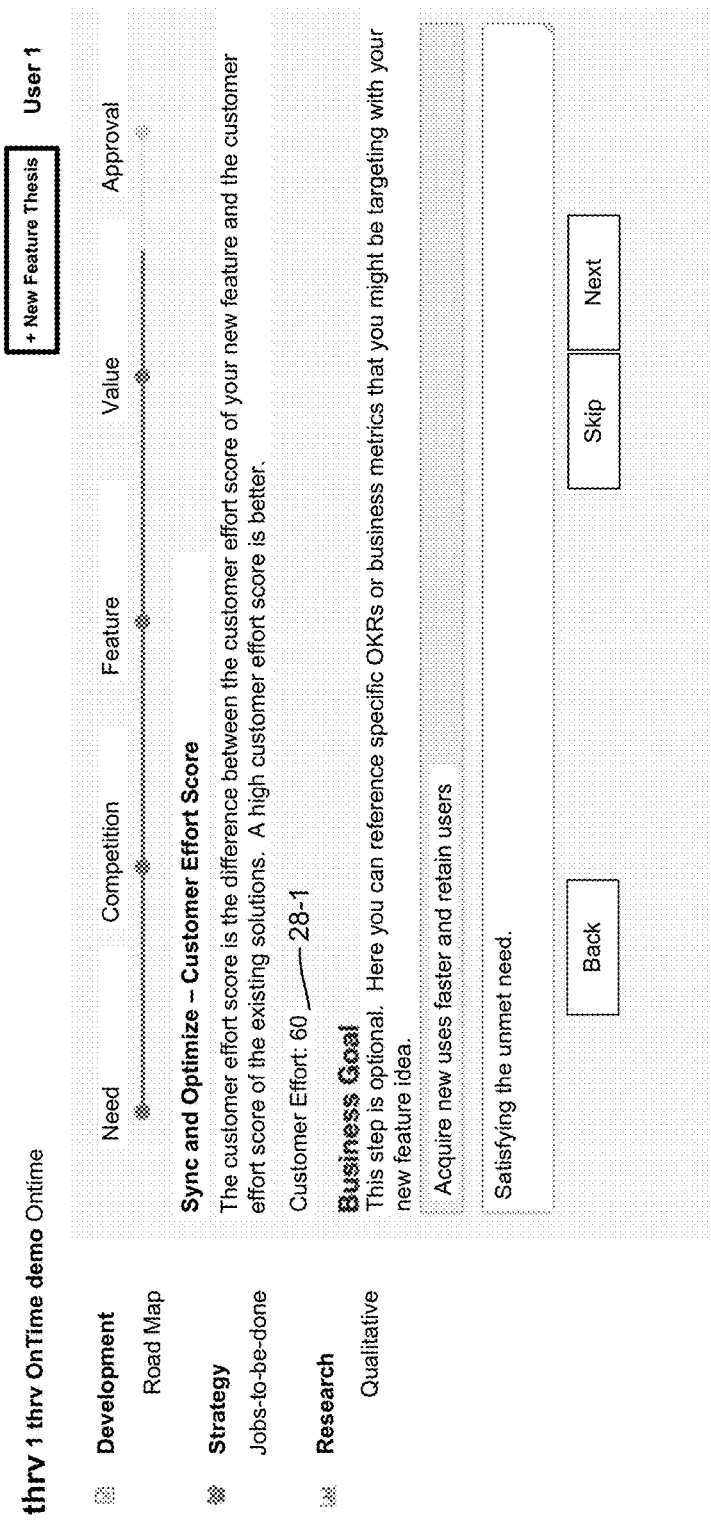

A client application 320 is a group of instructions that, when executed by a processor (e.g., CPU(s) 202), generates content (e.g., a visualization of a determination of a product roadmap investment decision and risk assessment of a candidate subject provided by the server 200 on the display 308 of the client device 300; user interface 500-1 of FIG. 5A; user interface 500-2 of FIG. 5B; user interface 500-3 of FIG. 5C; user interface 500-4 of FIG. 5D; user interface 500-5 of FIG. 5E; user interface 500-6 of FIG. 5F; user interface 500-7 of FIG. 5G; user interface 500-8 of FIG. 5H; user interface 500-9 of FIG. 5I; user interface 500-10 of FIG. 5J; user interface 500-11 of FIG. 5K; user interface 500-12 of FIG. 5L; user interface 500-13 of FIG. 5M; user interface 600-1 of FIG. 6A; user interface 600-2 of FIG. 6B; etc.) for presentation to a user of the client device 300.

In some embodiments, the client application 320 generates content in response to one or more inputs received from the user through the user interface 306 of the client device 300. For instance, in some embodiments, the client application 320 includes a data presentation application for viewing the contents of a file or web application that includes the determination of the product roadmap investment decision and risk assessment of the candidate subject (e.g., in the form of graph, charts, tables, drop down menus, etc.). By way of example, in some embodiments, a user of a client device 300, such as a customer for a candidate subject, utilizes the client device 300 to input to the system 100 a plurality of data elements in one or more data formats (e.g., one or more text data formats, one or more audio data formats, one or more video recordings, documents, etc.).

In various embodiments, the client device 300 and/or the client device 300 includes one or more processing units (CPUs), a network or other communications interface, a memory (e.g., a random access memory), one or more magnetic disk storage and/or persistent device optionally accessed by one or more controllers, one or more communication busses for interconnecting the aforementioned components, and a power supply for powering the aforementioned components. In some embodiments, data in memory is seamlessly shared with non-volatile memory using known computing techniques such as caching. In some embodiments, memory and/or memory may in fact be hosted on computers that are external to the recommendation system but that can be electronically accessed by the recommendation system over an Internet, intranet, or other form of network or electronic cable using a network interface.

In some embodiments, the client device 300 has any or all of the circuitry, hardware components, and software components found in the system depicted in FIG. 3. In the interest of brevity and clarity, only a few of the possible components of the client device 300 are shown to better emphasize the additional software modules that are installed on the client device 300.

Now that details of a computing system 100 for determining and providing a product roadmap investment decision and risk assessment of a candidate subject have been described, details regarding a flow chart of processes and features for implementing a method determining and providing a product roadmap investment decision and risk assessment of a candidate subject (e.g., method 400 of FIG. 4A), in accordance with an embodiment of the present disclosure, are disclosed with reference to FIG. 4.

Block 402. Referring to block 402 of FIG. 4, a method 400 is provided for determining a product investment decision and risk assessment. In some embodiments, the product investment decision and risk assessment includes a quantitative decision and risk assessment, such as a determination of a return on an investment, a value of story points in agile, a number of dollars per hour, a value of time needed for development of a candidate subject, and the like. However, the present disclosure is not limited thereto. For instance, in some embodiments, product investment decision and risk assessment is a subjective opinion that is provided by a user of present disclosure and confirmed, at least in part, by the determination of the product investment decision and risk assessment.

Block 404. Referring to block 404, the method 400 includes obtaining (e.g., via communications network 106 of FIG. 1), in electronic form, a plurality of data elements. In some embodiments, the plurality of data elements is obtained based on the subject matter association between a candidate subject and each respective data element in the plurality of data elements. By way of example, in some embodiments, the candidate subject is a new video game console and the plurality of data elements thus relate to video games and/or hardware consoles information. However, the present disclosure is not limited thereto. For instance, in some embodiments, the obtaining the plurality of data elements utilizes a plurality of data gathering mechanisms (e.g., data gathering mechanisms 14 of data gathering mechanism store 12 of FIG. 2A) to obtain the plurality of data elements. As a non-limiting example, in some embodiments, the plurality of data gathering mechanisms 14 includes one or more publication search mechanisms 14 such as a first data gathering mechanism 14-1 that obtains one or more data elements from publications of scholarly literature, such as academic journals or filings with a government entity (e.g., file histories of a patent). In some embodiments, the plurality of data gathering mechanism 14 includes a second data gathering mechanism 14-2 that obtains one or more data elements from an analog signal (e.g., an analog conversion mechanism 14), such as an analog to digital conversion mechanisms 14. Additionally, in some embodiments, the plurality of data gathering mechanisms 14 includes a third data gathering mechanism 14-3 that obtains one or more data elements from a user interface, such as a user interface presented through a display 308 of a client device 300 (e.g., user interface 500-5 of FIG. 5E) or a user interface of a client application 320 hosted on a remote device, such as a user interface of a website. Furthermore, in some embodiments, the plurality of data gathering mechanism 14 include a fourth data gathering mechanism 14-4 that obtains one or more data elements by providing a survey assessment associated with a candidate (e.g., thesis survey of the user interfaces 500 of client application 320 of FIGS. 5A through 5L). In some embodiments, the survey assessment provided by the fourth data gathering mechanism 14-4 is configured to obtain an accuracy response, an action variable response, an effort response (e.g., a response indicating the candidate subject will save a quantifiable effort of the subject), a speed response, a beneficiary response (e.g., the candidate subject will benefit the user, a friend of the user, a community associated with the user, etc.). As a non-limiting example, in some embodiments the server 200 provides the survey assessment for presentation on the display 308 of the client device 300 and obtains a plurality of data elements from the client device 300 associated with a corresponding plurality of responses provided by a user of the client device 300 responsive to the survey assessment. However, the present disclosure is not limited thereto.

In some embodiments, the candidate subject is a proposed investment provided by a user of a client device 300. For instance, referring briefly to FIG. 6B, a user interface 600 is presented on a client device 300 that allows a user to provide a candidate subject of a proposed new product that gets drivers to a destination on time. However, the present disclosure is not limited thereto. In some embodiments, the candidate subject includes a defined market in a plurality of defined markets. In this way, each market in the plurality of defined markets includes a corresponding plurality of customers that participate in the market, which defines a universe for a proposed investment candidate subject (e.g., customer and market sizes of FIG. 6B). As a non-limiting example, in some embodiments, the plurality of defined markets include one or more markets associated with a consumer product (e.g., smart phones, electric vehicles, etc.) and/or one or more markets associated with a commodity (e.g., wheat, gold, etc.) or associated with a service (e.g., users of ride sharing based client applications 320, a value of owners of a consumer product, etc.). However, the present disclosure is not limited thereto. By way of example, in some embodiments, the candidate subject is a defined market that is provided by a user of a client device (e.g., input through keyboard 310 of client device 300), such as a first candidate subject of a first market of drivers of vehicles, a second candidate subject of a second market of users of a specific operating system, a third candidate subject of a third market of GPS users, a fourth candidate subject of a fourth market of residences in a geographic region, and the like. However, the present disclosure is not limited thereto. In some embodiments, the candidate subject is a proposed product, such as a proposed client application 320 for a client device 300, a proposed product or industry (e.g., an electric propulsion alternative to solid state rocket fuels), a biologic, a pharmaceutical, a mechanical device, an electrical device, a food product, an advertising campaign, to name a few examples. One of skill in the art of the present disclosure will appreciate that the wide variety of candidate subjects are within the domain of the present invention.

In some embodiments, the plurality of data elements that is obtained by the plurality of data gathering mechanisms 14 includes a first set of data elements provided by a first user (e.g., provided through user interface 500-4 of FIG. 5D). In such embodiments, the first user is a respective user of a first client device 300-1. In some embodiments, the first client device 300-1 is different than a second client device 300-2 that is associated with requesting a determination of a product roadmap investment decision and risk assessment. However, the present disclosure is not limited thereto. Moreover, in some embodiments, the plurality of data elements that is obtained by the plurality of data gathering mechanisms 14 includes a second set of data elements derived from a plurality of information sources (e.g., published materials, databases, etc.). Accordingly, by utilizing a plurality of data elements that includes both the first set of user provided information and the second set of data elements from the plurality of information sources, the plurality of data gathering mechanisms 14 provides a robust collection of data elements that is tailored to a candidate subject based on the first set of data elements provided by the first user and the plurality of information sources. In some embodiments, the first set of data elements includes one or more customer behavior information values (customer tendencies, customer trends, etc.), a plurality of online search history and information (e.g., previous search queries, search preferences, etc.), a plurality of customer purchase information (e.g., invoices, product or service reviews, etc.), a plurality of customer calls audio files (e.g., customer-to-business calls, business-to-business calls, etc.), a plurality of product usage information (e.g., user history of a client application 320, historical user-base information, etc.) a plurality of usability testing and tracking information (e.g., private alpha testing tracking and information, public beta testing tracking and information, etc.), a plurality of customer feedback information, a plurality of support tickets, or any combination thereof. However, one of skill in the art will appreciate that the present disclosure is not limited thereto.

In some embodiments, the plurality of information sources includes one or more publication sources, such as one or more books, one or more news media, one or more scholarly articles. However, the present disclosure is not limited thereto. For instance, in some embodiments, the one or more one or more publication sources include one or more social media platforms or client application platforms, such as public ally available product reviews, public social media conversations, and the like, which is, optionally, obtained in conjunction with an application programing interface or the like.

In some embodiments, the one or more publication sources includes on or more public and/or private blockchains. Additional details and information regarding the obtaining of data elements from blockchain sources can be found at Brunner et al., 2019, "SPROOF: A Platform for Issuing and Verifying Documents in a Public Blockchain," ICIS SP, pg. 15; Hu et al., 2018, "Blockchain-based Smart Contracts-applications and Challenges," arXiv preprint arXiv:1810.04699, each of which is hereby incorporated by reference in its entirety.

In some embodiments, the plurality of information sources includes one or more private sources, such as one or more user created data elements provided by a user of a client device 300. In some embodiments, the private sources include offline document (e.g., inaccessible through communications network 106, such as a cold storage). Other non-limiting examples of a respective information source in the plurality of information sources includes online pages and documents, audio, video, customer behavior information, online searches, customer purchases, customer calls, product usage, usability testing and tracking information, customer feedback information, support tickets, technology-triggered events within a product, or a combination thereof, are stored in the database.

Block 406. Referring to block 406, the method 400 includes forming, based on a subset of the plurality of data elements, a taxonomy of data (e.g., second taxonomy of data 24-2 of FIG. 2B) using a plurality of classification models 20. The plurality of classification models 20 classify the plurality of data elements into a plurality of classifications (e.g., first classification 26-1 of FIG. 2B, classification A 26-A of FIG. 2B, etc.), which allow for creating a data structure from the plurality of data elements and, optionally, having a uniform formatting within the data structure. Moreover, in some embodiments, the plurality of classifications 26 is formed based on an aspect of the candidate subject. As such, each respective taxonomy of data 24 provides a data structure with the plurality of classifications 26 for the plurality of data elements that is obtained by the plurality of data gathering mechanisms 14. Moreover, by forming a respective taxonomy of data 24 based on the subset of the plurality of data elements, a portion of the plurality of data elements obtained by the plurality of data gathering mechanisms 14 is excluded from the taxonomy of data 24, such as one or more data elements that is considered not relevant to the candidate subject (e.g., data elements describing water-bearing propeller costs when the candidate subject is aircraft propeller). By way of example, in some embodiments, each data element in the subset of data elements satisfies a threshold relevancy criterion determined by at least one classification model 20 in the plurality of classification models 20. In this way, in some embodiments, the subset of the plurality of data elements includes less than all of the plurality of data elements should at least one data element in the plurality of data elements fail to satisfy the threshold relevancy criterion. This improves processing efficiency as discussed above. However, the present disclosure is not limited thereto. In alternative embodiments, the subset of the plurality of data elements includes the entire plurality of data elements gathered by the plurality of data gathering mechanism 14.

Additionally, in some embodiments, the taxonomy of data 24 includes at least one data element from the first set of data elements provided by a user of a client device 300 and at least one data element from the second set of data elements that is derived, or obtained from, a respective information source in the plurality of information sources. As a non-limiting example, consider a plurality of data elements that is obtained including a first set of data elements from an accounting spreadsheet created locally by a user on a client device and obtained from the client device 300 over a communications network 106, and a second set of data elements associated with the user that is obtained from a public social media web application. In this way, in some embodiments, the forming the taxonomy of data 24 includes translating, via at least one classification model 20 in the plurality of classification models 20, the plurality of data elements from a native format into a predetermined structured format.

The taxonomy of data 24 includes a plurality of classifications 26 that is determined by the plurality of classification models 20. For instance, in some embodiments, the plurality of classification models 20 include one or more sorting classification models 20 that sort a respective data element in the plurality of data elements obtained from the plurality of data gathering mechanisms 14 into one or more classification 26 in the plurality of classifications 26 of the taxonomy of data 24. Moreover, in some embodiments, the plurality of classifications 26 is generated in response to a candidate subject provided by a user.

In some embodiments, a respective classification 26 in the plurality of classifications 28 is associated with a plurality of customer goals and is defined as a decision goal (e.g., enable a respective customer to select from one or more predetermined selections), an optimization goal (e.g., optimize a route of travel goal), a process goal (e.g., reduce number of steps in a process), or the like. In some embodiments, the respective classification 26 is associated with a plurality of customers referring to a number of customers in a corresponding market classification 26 (e.g., as subjects involved in a customer goal classification 26). In this way, in some embodiments, content of a first classification 26-1 can overlap with content of a second classification 26-1, such as the first classification 26-1 is associated with data elements describing various consumer markets (e.g., motorcycle drivers, smart device users, etc.) and the second classification 26-2 is associated with data elements describing various customer goals (e.g., goals of how users interact with mechanical user interfaces, goals of how users interact with touch-display user interfaces, etc.). Furthermore, in some embodiments, the respective classification 26 is associated with a plurality of beneficiaries that distinguishes a plurality of beneficiary customers in the market. In some embodiments, the plurality of beneficiary customers in the market is defined as subjects benefitting from achieving the customer goal classification 26. Additionally, in some embodiments, the respective classification 26 is associated with a plurality of executors that distinguishes executor customers in the market. In some embodiments, the executor customers in the market is defined as a number of subjects currently involved in processes or technologies (e.g., competitor solutions of FIG. 5G, competitor solutions of FIG. 6C, etc.) used to achieve the customer goal classification 26. Finally, in some embodiments, the respective classification 26 is associated with purchase decision makers that distinguish purchase decision makers in the market. In some embodiments, the purchase decision makers in the market is defined as subjects influencing the decision to purchase solutions to achieve the customer goal. However, the present disclosure is not limited thereto. One of skill in the art will appreciate that the above-described classifications 26 are not limited to distinguishing aspects in a market, but can also be applied to distinguishing aspects of a candidate subject.

In some embodiments, at least one classification 26 in the plurality of classifications 26 includes a corresponding plurality of variables 28 that form a basis for determining a product roadmap investment decision and risk assessment. For instance, in some embodiments, a respective classification 26 includes a plurality of input variables 28 in the plurality of variables 28 in which each respective input variable 28 in the plurality of input variables 28 is associated with a variation in the respective classification 26. By way of example, consider a first classification 26-1 that describes a willingness to pay for a candidate subject, such that a first input variable 28-1 in a plurality of input variables 28 associated with the first classification 26-1 describes a range of a willingness to pay from five dollars to eight dollars based on a plurality of data elements obtained from one or more data gathering mechanism 14 (e.g., survey data gathering mechanism 14). However, the present disclosure is not limited thereto. In some embodiments, the variation is configured without human intervention (e.g., by server 200 of FIGS. 2A and 2B). In some embodiments, a respective variable 28 in the plurality of variables 28 associated with a corresponding classification 26 is a function of a second variable 28-2 in the plurality of variables 28 that is also associated with the corresponding classification 26 (e.g., a willingness to pay variable 28-1 is a function of a pricing variable 28-1 that are both associated with a corresponding customer segment classification 26). In some embodiments, the method 400 obtains, or retrieves (e.g., from memory 192 of FIG. 2A) the plurality of data elements gathered by the plurality of data gathering mechanisms 14. For instance, in some embodiments, a first classification 26-1 of a respective markets includes a first plurality of input variables 28 and structured data within a respective taxonomy of data 24. In some embodiments, the plurality of input variables 28 associated with a respective classification 26 includes a first variable number of customers 28-1, a second variable number of beneficiaries 28-2, a third variable number of executors 28-3, a fourth variable number of purchase decision makers 28-4, a fifth variable number of a plurality of customer goals 28-5, a sixth variable number of a plurality of customer steps 28-6, a seventh variable number of plurality of customer needs 28-7, a ninth variable value of a willingness to pay 28-9, or a combination thereof. In some embodiments, the plurality of customer goals forms a second classification 26-2 that includes a second plurality of input variables 28 and structured data within the respective taxonomy of data 24 independent of solutions in the first classification 26-1 of the market. However, the present disclosure is not limited thereto.

In some embodiments, for each respective classification 26, the plurality of variables 28 includes one or more control variables 28, which define one or more static variables 28 or user provided variables 28 that cannot be changed by the server 200 when determining and/or evaluating if a respective output in a range of outputs satisfies each threshold criterion in a plurality of threshold criteria. For instance, in some embodiments, the plurality of variables 28 includes a first speed variable 28-1 that is defined quantitatively, such as milliseconds, seconds, minutes, hours, days, etc. Referring briefly to FIG. 5J, as a non-limiting example, a first speed variable 28-1 is defined as "1 seconds" for a period of time to provide a realization of a candidate subject, such as an estimate of time to satisfy a need of a candidate subject. In some embodiments, for each respective classification 26, the plurality of variables 28 includes a second accuracy variable 28-2 that is defined quantitatively, such as a percentage from 0 percent to 100 percent or as a relative value (e.g., high, medium, low). Referring briefly to FIG. 5J, as a non-limiting example, the second accuracy variable 28-2 is defined as "98%." In some embodiments, for each respective classification 26, the plurality of variables 28 includes a third level of effort variable 28-3 that is defined quantitatively (e.g., as a percentage from zero to 100 percent, or high, medium, low, etc.). In some embodiments, the third level of effort variable 28-3 is defined as a percentage of a plurality of survey respondents based on a survey data gathering mechanism 14, such as a first percentage of the plurality of survey respondents that provided a predetermined answer (e.g., Yes or No to a survey prompt). In some embodiments, for each respective classification 26, the plurality of variables 28 includes a fourth perception of effort variable 28-4 that is defined quantitatively, similarly to the third level of effort variable 28-3 (e.g., as a percentage from 0 percent to 100 percent; high, medium, low; a percentage of survey respondents based on a survey data gathering mechanism 14, etc.). In some embodiments, for each respective classification 26, the plurality of variables 28 includes a fifth perception of emotion variable 28-5 that is defined quantitatively (e.g., as a percentage from 0 percent to 100 percent; high, medium, low; a percentage of survey respondents based on a survey data gathering mechanism 14, etc.

In some embodiments, the plurality of classifications 26 includes a first markets classification 26-1, a second customer goals classification 26-2, a third customers classification 26-3, a fourth beneficiary classification 26-4, a fifth executors classification 26-5, and a sixth purchase decision makers classification 26-6. Accordingly, each respective classification 26 in this plurality of classification 26 includes a corresponding customer steps variable 28 that is a function of one or more variables 28 of the second customer goals classification 26-2. For instance, in some embodiments, the corresponding customer steps variable 28 is defined as a process of steps a customer has to go through to achieve the goal (e.g. user interface 500-3 of FIGS. 5C, user interface 500-4 of FIGS. 5D, user interface 500-5 of FIG. 5E, user interface 600-2 of FIG. 6B, etc.). In some embodiments, for each respective set of markets, there are a plurality of corresponding customer needs with discrete structured data and is defined as customer needs can be defined as customer actions and variables 28 related to the corresponding customer steps variable 28 and the second customer goals classification 26-2.

Block 408. Referring to block 408, the method 400 includes determining, based on the forming, a respective output from a range of outputs in accordance with a selection of a set of variables 28.

In some embodiments, the respective output includes a willingness to pay for a candidate subject. In some embodiments, the respective output includes a customer segment, such as a range of customers within a market classification 26. In some embodiments, the respective output includes a customer value, such as a pricing for the candidate subject. In some embodiments, the respective output includes an assessment of a risk, such as a risk assessment and/or a technology risk assessment. Elliot et al., 2019. In some embodiments, the respective output includes a financial investment, such as a total estimated cost to provide a realization of a candidate subject. In some embodiments, the respective output includes a probability of success of providing the realization of the candidate subject. In some embodiments, the respective output includes a revenue growth, such as an estimate of revenue growth given a respective customer segment. In some embodiments, the respective output includes a return on investment, such as an estimate of profits when providing the realization of the candidate subject.

In some embodiments, the selection of the respective set of variables 28 includes a first set of input variables 28 from the corresponding plurality of variables 28 for the at least one classification 26. In some embodiments, the respective selection of the respective set of variables 28 includes a second set of control variables 28 that is associated with the candidate subject. In some embodiments, each respective control variables is defined by a user of a client device and is static, in that the method 400 cannot change a respective control variable without authorization or input from the user. However, the present disclosure is not limited. In some embodiments, each respective input variable 28 is configured by a user of a client device 300. For instance, in some embodiments, the user of the client device 300 configures a value or a range of values of a respective input variable 28, such as a percentage of an accuracy variable 28. In some embodiments, each respective input variable 28 is configurable by the server 200, such as reconfiguring the range of values configured by the user or selecting a specific value within the range of values.

In some embodiments, the respective output is defined using one or more variables from either a first customer needs classification 26-1 or a second customer steps classification 26-2, such as if the respective output is one or more customer segments. In some embodiments, one or more variables 28 utilized in determining the one or more customer segments for either the first customer needs classification 26-1 or the second customer steps classification 26-2 includes the speed variable 28, the accuracy variable 28, the level of effort variable 28, the perception of effort variable 28, and/or the perception of emotion variable, or a combination thereof. For example, consider a survey data gathering mechanism 14 that provides a survey to a respective user (e.g., communicated to client device 300), in which the survey includes one or more prompts related to a plurality of customer needs, such that the survey obtains a plurality of data elements associated with a customer needs classification 26. Accordingly, in some embodiments, the respective customer provides, via the user interface 306 of the client device 300, one or more customer effort scores in response to the one or more prompts of the data gathering mechanism 14, and the one or more customer effort scores is obtained by the server 200. Accordingly, in some embodiments, a respective output of one or more customer segments is determined based on the evaluation the respective output against a plurality of threshold criteria. Here, the plurality of threshold criteria a first threshold criterion associated with the customer effort score of the candidate subject and a second threshold criterion associated with a plurality of statistical models 32.

In some embodiments, the respective set of variables 28 includes a first variable 28-1 defined by a user and a second variable 28-2 defined without human intervention, such as by one or more classification models 20 and/or one or more statistical models 32. For instance, in some embodiments, a first user that provides the candidate subject defines a first variable 28-1 of a revenue growth (e.g., 325% quarterly growth for first three years of product launch), and, in response to the defining of the first variable 28-1, a second variable 28-2 of a customer effort is defined by one or more classification models 20 and/or one or more statistical models 32.

In some embodiments the first set of input variables 28 includes a first input variable 28-1 of a respective description of customers, such as description of one or more customers that define a market classification 26. In some embodiments, the first set of input variables 28 includes a second input variable 28-2 of a respective description of beneficiaries, such as description of one or more beneficiaries of a candidate subject within the market classification 26. In some embodiments, the first set of input variables 28 includes a third input variable 28-3 of a respective description of executors. In some embodiments, the first set of input variables 28 includes a fourth input variable 28-4 of a respective description of purchase decision makers within the market classification 26. In some embodiments, the first set of input variables 28 includes a fifth input variable 28-5 of a respective description of customer goals for the market classification 26. In some embodiments, the first set of input variables 28 includes a sixth input variable 28-6 of a respective description of customer steps to provide a realization of a candidate subject within the market classification 26. In some embodiments, the first set of input variables 28 includes a seventh input variable 28-7 of a respective description of customer needs within the market classification 26.

In some embodiments, the forming the taxonomy of data 24 further includes storing the taxonomy of data 24. In some embodiments, the taxonomy of data 24 is stored at a server (e.g., server 200 of FIGS. 2A and 2B), at a client device (e.g., client device 300 of FIG. 1), or a combination thereof.

In some embodiments, the plurality of threshold criteria includes a first threshold criteria associated with a threshold variance in the selection of the respective set of variables 28. For instance, in some embodiments, the threshold variance is a minimum deviation between a selection of a first variable 28-1 and a selection of a second variable 28-2. By requiring that the plurality of threshold criteria includes the threshold variance, a determination of a product roadmap investment decision and risk assessment provided by the method 400 is robust and not narrowly tailored. However, the present disclosure is not limited thereto.

Block 410. Referring to block 410, the method 400 includes evaluating the respective output against a plurality of threshold criteria. The plurality of threshold criteria includes a first threshold criterion associated with the candidate subject and a second threshold criterion associated with a plurality of statistical models (e.g., statistical models 32 of FIG. 2B). In some embodiments, a respective statistical model includes 10 or more parameters, 20 or more parameters, 30 or more parameters, 40 or more parameters, 50 or more parameters, 100 or more parameters, 200 or more parameters, 400 or more parameters, or 1000 or more parameters that each contribute to determining and/or evaluating a respective output in accordance with the respective statistical model. In some embodiments, an example of "parameters" of a statistical model 32 includes a plurality weights and/or a plurality of coefficients used by the statistical model 32.

In some embodiments, the respective output includes one or more customer segments. The one or more customer segments of the respective output is defined quantitatively and also determined using one or more statistical models 32 in the plurality of statistical models 32. In some embodiments, the one or more statistical models 32 utilized includes a first factoring statistical model 32-1 (e.g., a factor analysis statistical model 32). Additional details and information regarding factoring statistical models 32 is described in Harman, Harry H., 1976, "Modern factor analysis," University of Chicago press, print, and Child, Dennis, 1990, "The essentials of factor analysis," Cassell Education, print, each of which is hereby incorporated by reference in their entirety. In some embodiments, the one or more statistical models 32 utilized includes a second clustering statistical model 32-2 (e.g., a hierarchical clustering statistical model 32). Additional details and information regarding clustering statistical models 32 is described in Johnson, Stephen C., 1967, "Hierarchical clustering schemes," Psychometrika, 32(3), pg. 241, which is hereby incorporated by reference in its entirety. In some embodiments, the one or more statistical models 32 utilized includes a third kurtosis statistical model 32-3. Additional details and information regarding kurtosis statistical models 32 is described in DeCarlo, Lawrence T., 1997, "On the meaning and use of kurtosis," Psychological methods, 2(3), pg. 292, and Mardia, Kanti V., 1970, Measures of multivariate skewness and kurtosis with applications," Biometrika, 57(3), pg. 519, each of which is hereby incorporated by reference in their entirety.

In some embodiments, the respective output of the one or more customer segments is defined using either a selection of a set of variables 28 from the customer needs classification 26 or the customer steps classification 26. In some embodiments, one or more variables 28 utilized in determining the one or more customer segments of the respective output for either the customer needs or the customer steps includes the speed variable 28, the accuracy variable 28, the level of effort variable 28, the perception of effort variable 28, the perception of emotion variable 28, or a combination thereof. For example, consider a data gathering mechanism 14 that provides a survey assessment to a respective customer 102 (e.g., communicated to client device 300 associated with the respective customer), in which the server 200 obtains a plurality of data elements including one or more responses to one or more prompts related to a plurality of customer needs. Accordingly, the plurality of data elements is classified by a plurality of classification models 20 into at least a customer needs classification 26. Accordingly, a respective output of one or more customer segments is determined based on utilizing one or more statistical models and the customer effort classification 26.

Accordingly, the method 400 determines and evaluates if the respective output of the customer segment, using a first selection of a first set of variables 28 in the plurality of variables 28, satisfies a plurality of threshold criteria (e.g., a first threshold criterion in the plurality of threshold criteria that indicates enough variation from the non-segmented customers, the beneficiaries, or the executors). In some embodiments, if the method 400 determines the first threshold criterion is not satisfied by the first selection of the first set of variables 28, a second selection of a set of variables 28 including one or more input variables 28 for a first categorization 26-1 of customer needs and one or more input variables 28 for a second classification 26-2 of customer steps are used (e.g., from within the customer goals) to determine if the plurality of threshold criteria is satisfied using the second selection of the respective set of variables 28 including the one or more input variables 28 for the first categorization 26-1 of customer needs and the one or more input variables 28 for the second classification 26-2 of customer steps that would meet the first threshold criterion for variation. In some embodiments, once the first threshold criterion is satisfied, the method 400 proceeds to use the selected set of customer needs and/or customer steps that satisfied the first threshold criterion for further evaluations (e.g., reiterative evaluations of block 410 of FIG. 4).

Block 412. Referring to block 412, the method 400 includes determining if the respective output satisfies each threshold criterion in the plurality of threshold criteria. By way of example, in some embodiments, the system 100 determines and evaluates if the respective set of variables selected (e.g., a control variable from a market classification 26 and a first set of input variables from a customer segment classification 26) satisfies the plurality of threshold criteria for a product roadmap investment decision. If the method 400 determines that the plurality of threshold criteria is not satisfied by the respective output, and thus the selection of the respective set of variables, a selection of a second set of variables is provided (e.g., a second selection of a willingness to pay data is used for a further customer segment) to be analyzed. In some embodiments, this reiterative selection of a respective set of variables is repeated until the plurality of threshold criteria is satisfied. In some embodiments, this reiterative selection of a respective set of variables is repeated one, two, three, four, five, six, 10, 100, 1000, or 10,000 times before the plurality of threshold criteria is satisfied. In some embodiments, in accordance with a determination that the plurality of threshold criteria is satisfied, the method 400 proceeds to use the respective output (e.g., the willingness to pay with the corresponding customer segment) for further evaluations and calculations using the plurality of statistical models 32. For example, consider a customer using a client device 300 of the system 100 to determine a product roadmap investment decision for a candidate subject of a product that assists other users to arrive at a destination on time with at least five-million dollars in revenue (e.g., a respective threshold criterion in the plurality of threshold criteria). However, consider that the respective output of the determined willingness to pay is below the five-million dollars threshold criterion. Accordingly, the method 400 reiterates evaluating if a selection of a second set of variables (e.g., the control variable 28 from the market classification 26 and a second set of input variables 28 from the customer segment classification 26) satisfies the five-million dollars threshold criterion.

In some embodiments, with the selection of a set of variables 28 from the customer segment classification 26 and the willingness to pay classification 26, a respective output including a customer value is evaluated by determining a pricing that would optimize a respective candidate subject (e.g., investment in a product). In some embodiments, the respective output of the pricing is determined using one or more statistical models 32 in the plurality of statistical models 32, such as an optimization statistical based on the respective set of variables of the willingness to pay for the customer segment. In some embodiments, the statistical optimization utilized by a respective statistical model 32 in determining a pricing includes a Pareto efficiency optimization, which occurs when a state of equilibrium is achieved between a plurality of competitive groups (e.g., a first group cannot be improved without worsening a second group), such as a production possibility frontier. Additional details and information regarding Pareto efficiency is described in Pettinger, Tejvan, "Pareto efficiency, Economics Help, online, accessed Mar. 31, 2020 (economicshelp.org/blog/glossary/pareto-efficiency), which is hereby incorporated by reference in its entirety.

In some embodiments, the respective output includes a customer value from a range of customer values. In some embodiments, the customer value is determined using an input variable of an assessment of technology risk that is defined quantitatively (e.g., as a percentage from zero, unknown, to 100%, known with perfect certainty, etc.). For example, consider an unmet customer need classification, such as a need to determine an optimal number of stops when travelling to a destination. Accordingly, the system 100 determines if there is one or more known solutions and/or one or more known customers attempting a solution (e.g., gathering a plurality of data elements via a plurality of data gathering mechanisms 14, classifying the plurality of data elements, etc.) than a corresponding assessment of technology risk is low. However, if no known solutions and/or known customers exists, then the corresponding assessment of technology risk is high. Furthermore, in some embodiments, a customer value is determined using an input variable of a dollar investment required for a realizing a respective product roadmap of a candidate subject. In some embodiments, the dollar investment is provided by a respective customer as an input to the system 100 via a client device (e.g., in response to a survey assessment provided to the customer). Moreover, in some embodiments, the dollar investment describes a quantitative estimation of a product roadmap investment, such as a number of story points in agile, or dollars per hour and a total number of hours needed for product development. Additional details and information regarding story points in agile is described in Coelho et al., 2012, "Effort estimation in agile software development using story points," International Journal of Applied Information Systems, 3(7), print, which is hereby incorporated by reference in its entirety. Additionally, in some embodiments, the respective output includes a probability of success. The probability of success is determined using a change from an initial value of one or more input and/or control variables for a first classification of customer needs 26-1 or a second classification of customer steps 26-2 (e.g., speed, accuracy, level of effort, perception of effort, perception of emotion) and a new value of the one or more variables based on a new feature idea in the product roadmap. In some embodiments, the probability of success is based on a determination of unmet customer needs and a value added for a customer segment in addition to a technology risk. In some embodiments, a user defines one or more of the above described variables as an input to the system 100.

In some embodiments, the respective output includes how much revenue growth will likely be generated. Accordingly, in some embodiments, the plurality of threshold criteria includes a respective threshold criteria of a threshold revenue growth. If the respective threshold criterion is not satisfied, the method 400 reevaluates the above describe determinations (e.g., block 408 of FIG. 4, block 412 of FIG. 4) using a different set of input variables that includes a different pricing optimization. In some embodiments, if the respective threshold is not satisfied, the method 400 reiterates conducting the above describe determinations (e.g., block 408 of FIG. 4, block 412 of FIG. 4) using a control variable (e.g., a different classification 26 of market or a customer segment) with a different set of input variables (e.g., a different classification 26 of willingness to pay 415. For example, consider a user using a client device 300 of the system 100 to determine a product roadmap investment decision and risk assessment for a candidate subject that is new product (e.g., investment) for determining an optimal sequence of stops when travelling to a destination. The system 100 determines (e.g., through one or more customer respondents to a survey) that the new product candidate subject will change a customer effort score from 85% to 15% (e.g., high difficulty to low difficulty). Accordingly, method 400 determines that approximately 40% of a market share will be needed in order to satisfy a desired revenue growth threshold criterion.

In some embodiments, the respective output includes a messaging resonance that is defined quantitatively. In some embodiments, the messaging resonance is defined as a percentage from zero percent to one hundred percent of customer respondents to a survey (e.g., a survey provided by the server 200). By way of example, in some embodiments, the percentage of the messaging resonance is an estimate of customers estimated to purchase and/or express interest in a candidate subject, In some embodiments, the respective output includes a competitive position that is defined quantitatively. In some embodiments, the competitive position is defined as a difference between a first customer value created by a candidate subject and a second customer value created by competitor products. In some embodiments, this second customer value is obtained by the plurality of data gathering mechanisms 14 and stored in a respective taxonomy of data 24, whereas the first customer value is provided by a user of the system 100 as an input variable.

In some embodiments, the respective output includes a market position that is defined quantitatively. In some embodiments, the market position is defined as a sum of a difference between the first customer value and the second customer value created by competitor products for each respective customer step and each respective customer need in the target customer segment of the respective output.

Moreover, in some embodiments, the respective output includes a revenue growth and the respective set of variables selected in accordance with the respective output includes a market resonance, a competitive position, a market position or a combination thereof. For instance, consider a user of a client device 300 of the system 300 determining a product roadmap investment decision and risk assessment for a candidate subject that is new product (e.g., investment) for determining an optimal sequence of stops when travelling to a destination. A first message of "get there faster" and a second message of "your day and stops, optimized" are evaluated to determine a respective output that includes a first revenue growth associated with the first message and a second revenue growth associated with the second message. Accordingly, the method 400 determines (e.g., through evaluating one or more data elements associated with respondents to a survey with a plurality of statistical models 32) that the second message has a higher respective message resonance than the first message. Accordingly, the method 400 determines that the second message will likely result in a respective higher revenue growth 424 than the first message.

In some embodiments, once the revenue growth has met one or more revenue threshold criteria in the plurality of threshold criteria (e.g., a fourth threshold criterion), the method 400 determines a respective output of a return on investment, such as by using the revenue and the product roadmap investment. Furthermore, in some embodiments, the method 400 determines as a respective output a risk assessment using the customer value and the technology risk. If the return on investment does not satisfy a threshold value criterion in the plurality of threshold criterion, a fifth decision engine 431 will begin conducting the above described determinations (e.g., block 408 of FIG. 4, block 412 of FIG. 4) using a selection of a second set of variables including one or more markets variables and one or more customer goals variables.

Block 414. Referring to block 414, the method 400 includes providing, in electronic form, based on the determining if the respective output satisfies each threshold criterion (e.g., if a respective threshold criterion in the plurality of threshold criteria that requires at least five-million dollars in revenue), a product investment decision and risk assessment for the candidate subject in accordance with the satisfaction of each threshold criterion in the plurality of threshold criteria. For instance, in some embodiments, the providing the product investment decision and risk assessment includes communicating a report, in electronic form, from the server 200 to a respective client device 300. In some embodiments, the providing the product investment decision and risk assessment includes configuring a user interface.

Referring to FIGS. 5A through 5M and FIGS. 6A through 6E, exemplary user interfaces are depicted that allow a customer 102 to determine a product roadmap investment decisions and risk assessment through a client device 300. In some embodiments, the systems and methods of the present disclosure to create a product roadmap investment profile and a risk assessment profile for a user. In some embodiments, the user accesses the product roadmap investment profile and the risk assessment profile though a display of a client device (e.g., a software interface of a client application presented through the display of the client device). In some embodiments, based on the product roadmap investment profile and the risk assessment profile, a user creates a feature thesis for the product roadmap and can gain agreement with one or more users on the priority, timing, level of investment, risk, and value of the feature in the product roadmap, or a combination thereof. In some embodiments, an input provided by a user regarding the product roadmap investment profile and/or the risk assessment profile is used for further improvement in determining product roadmap investment decisions and risk assessment.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer readable storage medium. For instance, the computer program product could contain the program modules shown in any combination of FIG. 1, 2A, 2B or 3. These program modules can be stored on a CD-ROM, DVD, magnetic disk storage product, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method for rendering a product investment decision and risk assessment report on a computing system screen, the method comprising: for each respective user in a plurality of users, wherein the plurality of users comprises more than two users: (A) obtaining, in electronic form, a plurality of data elements associated with a candidate subject, wherein: (i) the plurality of data elements comprises a first set of data elements provided by a first user and a second set of data derived from a plurality of information sources, (ii) each information source in the plurality of information sources is unassociated with the first user, and (iii) the candidate subject is a subject matter defined by a first subject different from an aspect of the first user; (B) forming, in electronic form, based on a subset of the plurality of data elements, a taxonomy of data using at least two classification models in a plurality of classification models, wherein: the subset of the plurality of data elements is selected by a first classification model in the plurality of classification models and comprises: (i) less than all of the plurality of data elements and (ii) at least one data element from the first set of data and at least one data element from the second set of data, the forming the taxonomy of data comprises converting, by the computing system, via at least one classification model in the plurality of classification models, the plurality of data elements from a native format into a predetermined structured format, the converting comprising: converting a first data element of the plurality of data elements from the native format of an audio data format into the predetermined structured format of a text file format, and converting a second data element of the plurality of data elements from the native format of a plain text format into the predetermined structured format that defines each variable of a polynomial equation and deconstructs the polynomial equation into a plurality of unit operations, and the taxonomy of data comprises a plurality of classifications determined by the plurality of classification models, and wherein at least one classification in the plurality of classification comprises a corresponding plurality of input variables associated with a user-defined variation in the at least one classification; (C) determining, based on the forming (B), a respective output from a range of outputs using at least one statistical model in a plurality of statistical models, different from the plurality of classification models, in accordance with a selection of a respective set of variables comprising a respective first set of input variables from the corresponding plurality of variables for the at least one classification and a respective second set of control variables associated with the candidate subject, wherein each control variable in the respective second set of control variables provides a static boundary condition in the range of outputs defined by the first user; (D) evaluating the respective output against a plurality of threshold criteria, wherein the plurality of threshold criteria comprises at least four threshold criteria comprising a first threshold criterion associated with a variance associated with the selection of the respective set of variables determined by a respective classification model in the plurality of classification models and a second threshold criterion associated with an output evaluated by a respective statistical model in the plurality of statistical models; (E) determining if the respective output satisfies each threshold criterion in the plurality of threshold criteria; and (F) generating, in electronic form, for display at a client device associated with the first user, when the respective output satisfies each threshold criterion in the plurality of threshold criteria based on the determining (E), a report for the first user comprising a product investment decision and risk assessment for the candidate subject in accordance with the satisfaction of each threshold criterion in the plurality of threshold criteria.

2. The method of claim 1, wherein the obtaining (A) utilizes a plurality of data gathering mechanisms to obtain the plurality of data, wherein the plurality of data gathering mechanisms comprises one or more publication search mechanisms, one or more analog conversion mechanisms, one or more user interface mechanisms, one or more survey mechanism, or a combination thereof.

3. The method of claim 1, wherein the candidate subject is a defined market in a plurality of defined markets, and wherein each market in the plurality of defined markets comprises a corresponding plurality of customers.

4. The method of claim 1, wherein the plurality of information sources comprises one or more publication sources and one or more private sources.

5. The method of claim 1, wherein converting the first data element of the plurality of data elements from the native format of the audio data format into the predetermined structured format of the text file format includes converting the audio data format of at least one selected from the group consisting of pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, and WINDOWS media audio (WMA) format into the text file format.

6. The method of claim 1, wherein the subset of the plurality of data elements is determined by the plurality of classification models.

7. The method of claim 1, wherein each data element in the subset of data elements satisfies a threshold relevancy score determined by at least one classification model in the plurality of classification models.

8. The method of claim 1, wherein the first set of input variables in the respective set of variables comprises a first input variable of a respective description of customers, a second input variable of a respective description of beneficiaries, a third input variable of a respective description of executors, a fourth input variable of a respective description of purchase decision makers, a fifth input variable of a respective description of customer goals, a sixth input variable of a respective description of customer steps, or a seventh input variable of a respective description of customer needs, or a combination thereof.

9. The method of claim 1, wherein the second set of control variables in the respective set of variables comprises a first control variable of a respective description of a speed, a second control variable of a respective description of an accuracy, a third control variable of a respective description of a level of effort, a fourth control variable of a respective description of a perception of effort, or a fifth control variable of a respective description of a perception of emotion, or a combination thereof.

10. The method of claim 8, wherein the plurality of statistical models comprises a clustering model, a factoring model, a kurtosis model, a Pareto efficiency model, or an assessment of risk model, or a combination thereof.

11. The method of claim 1, wherein the respective set of variables comprises a first variable defined by a user and a second variable defined without human intervention.

12. The method of claim 1, wherein the forming (B) further comprises storing the taxonomy of data.

13. The method of claim 1, wherein the respective output comprises a willingness to pay, a customer segment, a customer value, an assessment of a risk, a financial investment, a probability of success, a revenue growth, a message resource, a return on investment, or a combination thereof.

14. The method of claim 1, wherein the plurality of data elements comprises at least 1000 data elements.

15. The method of claim 1, wherein at least the determining (C), evaluating (D), and determining (E) are repeated a plurality of times before the respective output satisfies each threshold criterion in the plurality of threshold criteria based on the determining (E), wherein each repetition of the determining (C), evaluating (D), and determining (E) uses a different respective set of variables comprising a different respective first set of input variables from the corresponding plurality of variables for the at least one classification and a different respective second set of control variables associated with the candidate subject.

16. The method of claim 15, wherein the determining (C), evaluating (D), and determining (E) are repeated at least 10 times before the respective output satisfies each threshold criterion in the plurality of threshold criteria based on the determining (E).

17. The method of claim 1, wherein the determining (C) further comprises using at least one statistical model in the plurality of statistical models to determine the respective output.

18. A computer system for rendering a product investment decision and risk assessment report on a computing system screen, the computer system comprising at least one processor, and a memory storing at least one program for execution by the at least one processor, the at least one program comprising instructions for: for each respective user in a plurality of users, wherein the plurality of users comprises more than two users: (A) obtaining, in electronic form, a plurality of data elements associated with a candidate subject, wherein: (i) the plurality of data elements comprises a first set of data elements provided by a first user and a second set of data derived from a plurality of information sources, (ii) each information source in the plurality of information sources is unassociated with the first user, and (iii) the candidate subject is a subject matter defined by a first subject different from an aspect of the first user; (B) forming, in electronic form, based on a subset of the plurality of data elements, a taxonomy of data using at least two classification models in a plurality of classification models, wherein: the subset of the plurality of data elements is selected by a first classification model in the plurality of classification models and comprises: (i) less than all of the plurality of data elements and (ii) at least one data element from the first set of data and at least one data element from the second set of data, the forming the taxonomy of data comprises converting, by the computing system, via at least one classification model in the plurality of classification models, the plurality of data elements from a native format into a predetermined structured format, the converting comprising: converting a first data element of the plurality of data elements from the native format of an audio data format into the predetermined structured format of a text file format, and converting a second data element of the plurality of data elements from the native format of a plain text format into the predetermined structured format that defines each variable of a polynomial equation and deconstructs the polynomial equation into a plurality of unit operations, and the taxonomy of data comprises a plurality of classifications determined by the plurality of classification models, and wherein at least one classification in the plurality of classification comprises a corresponding plurality of input variables associated with a user-defined variation in the at least one classification; (C) determining, based on the forming (B), a respective output from a range of outputs using at least one statistical model in a plurality of statistical models, different from the plurality of classification models, in accordance with a selection of a respective set of variables comprising a respective first set of input variables from the corresponding plurality of variables for the at least one classification and a respective second set of control variables associated with the candidate subject, wherein each control variable in the respective second set of control variables provides a static boundary condition in the range of outputs defined by the first user; (D) evaluating the respective output against a plurality of threshold criteria, wherein the plurality of threshold criteria comprises at least four threshold criteria comprising a first threshold criterion associated with a variance associated with the selection of the respective set of variables determined by a respective classification model in the plurality of classification models and a second threshold criterion associated with an output determined by a respective statistical model in the plurality of statistical models; (E) determining if the respective output satisfies each threshold criterion in the plurality of threshold criteria; and (F) generating, in electronic form, for display at a client device associated with the first user, when the respective output satisfies each threshold criterion in the plurality of threshold criteria based on the determining (E), a report for the first user comprising a product investment decision and risk assessment for the candidate subject in accordance with the satisfaction of each threshold criterion in the plurality of threshold criteria.

19. A non-transitory computer readable storage medium storing one or more programs, the one or more programs comprising instructions, which when executed by a computer system, cause the computer system to perform a method comprising: for each respective user in a plurality of users, wherein the plurality of users comprises more than two users: (A) obtaining, in electronic form, a plurality of data elements associated with a candidate subject, wherein: (i) the plurality of data elements comprises a first set of data elements provided by a first user and a second set of data derived from a plurality of information sources, (ii) each information source in the plurality of information sources is unassociated with the first user, and (iii) the candidate subject is a subject matter defined by a first subject different from an aspect of the first user; (B) forming, in electronic form, based on a subset of the plurality of data elements, a taxonomy of data using at least two classification models in a plurality of classification models, wherein: the subset of the plurality of data elements is selected by a first classification model in the plurality of classification models and comprises: (i) less than all of the plurality of data elements and (ii) at least one data element from the first set of data and at least one data element from the second set of data, the forming the taxonomy of data comprises converting, by the computing system, via at least one classification model in the plurality of classification models, the plurality of data elements from a native format into a predetermined structured format, the converting comprising: converting a first data element of the plurality of data elements from the native format of an audio data format into the predetermined structured format of a text file format, and converting a second data element of the plurality of data elements from the native format of a plain text format into the predetermined structured format that defines each variable of a polynomial equation and deconstructs the polynomial equation into a plurality of unit operations, and the taxonomy of data comprises a plurality of classifications determined by the plurality of classification models, and wherein at least one classification in the plurality of classification comprises a corresponding plurality of input variables associated with a user-defined variation in the at least one classification; (C) determining, based on the forming (B), a respective output from a range of outputs using at least one statistical model in a plurality of statistical models, different from the plurality of classification models, in accordance with a selection of a respective set of variables comprising a respective first set of input variables from the corresponding plurality of variables for the at least one classification and a respective second set of control variables associated with the candidate subject, wherein each control variable in the respective second set of control variables provides a static boundary condition in the range of outputs defined by the first user; (D) evaluating the respective output against a plurality of threshold criteria, wherein the plurality of threshold criteria comprises at least four threshold criteria comprising a first threshold criterion associated with a variance associated with the selection of the respective set of variables determined by a respective classification model in the plurality of classification models and a second threshold criterion associated with an output evaluated by a respective statistical model in the plurality of statistical models; (E) determining if the respective output satisfies each threshold criterion in the plurality of threshold criteria; and (F) generating, in electronic form, for display at a client device associated with the first user, when the respective output satisfies each threshold criterion in the plurality of threshold criteria based on the determining (E), a report for the first user comprising a product investment decision and risk assessment for the candidate subject in accordance with the satisfaction of each threshold criterion in the plurality of threshold criteria.

20. The method of claim 1, wherein the taxonomy of data is uniquely formed for the candidate subject.

* * * * *